US 10,435,496 B2
Oct. 8, 2019

(12) United States Patent
Reed et al.

(10) Patent No.: US 10,435,496 B2
(45) Date of Patent: *Oct. 8, 2019

(54) ENHANCED OIL RECOVERY USING MOBILITY CONTROL CROSSLINKED POLYMERS

(71) Applicant: ECOLAB USA INC., Eagan, MN (US)

(72) Inventors: Peter E. Reed, Plainfield, IL (US); William J. Andrews, Parker, CO (US); Mingli Wei, Naperville, IL (US); Xiaojin Harry Li, Palatine, IL (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/154,701

(22) Filed: Jan. 14, 2014

(65) Prior Publication Data
US 2014/0209304 A1    Jul. 31, 2014

Related U.S. Application Data

(60) Provisional application No. 61/759,101, filed on Jan. 31, 2013.

(51) Int. Cl.
| | |
|---|---|
| C09K 8/588 | (2006.01) |
| E21B 43/16 | (2006.01) |
| C08F 222/38 | (2006.01) |
| C08F 220/56 | (2006.01) |
| C08L 33/26 | (2006.01) |

(52) U.S. Cl.
CPC .......... *C08F 222/38* (2013.01); *C08F 220/56* (2013.01); *C08L 33/26* (2013.01); *C09K 8/588* (2013.01); *E21B 43/16* (2013.01); *E21B 43/162* (2013.01)

(58) Field of Classification Search
CPC .......... E21B 33/13; E21B 43/26; E21B 43/16; E21B 43/25; C09K 8/588; C09K 8/512; C09K 8/516; C09K 8/5083; C09K 8/68; C09K 8/12
See application file for complete search history.

(56) References Cited

U.S. PATENT DOCUMENTS

| | | | |
|---|---|---|---|
| 912,065 A | 2/1909 | Bostrom | |
| 3,247,171 A | 4/1966 | Walker et al. | |
| 3,551,384 A | 12/1970 | Zeh, Jr. | |
| 3,938,594 A | 2/1976 | Rhudy et al. | |
| 3,953,342 A | 4/1976 | Martin et al. | |
| 4,137,182 A | 1/1979 | Golinkin | |
| 4,250,070 A | 2/1981 | Ley et al. | |
| 4,728,696 A | 3/1988 | Van Phung et al. | |
| 4,779,680 A | 10/1988 | Sydansk | |
| 4,842,071 A | 6/1989 | Zaitoun et al. | |
| 4,872,071 A * | 10/1989 | Easton et al. .................. 360/31 |
| 4,954,538 A | 9/1990 | Dauplaise et al. | |
| 4,970,340 A | 11/1990 | Smith | |
| 5,130,479 A | 7/1992 | Ulbrich et al. | |
| 5,447,199 A | 9/1995 | Dawson et al. | |
| 5,543,446 A | 8/1996 | Rodriguez | |
| 5,840,804 A | 11/1998 | Carl et al. | |
| 5,883,210 A | 3/1999 | Ahmed et al. | |
| 6,235,150 B1 | 5/2001 | Middleton et al. | |
| 6,238,521 B1 | 5/2001 | Shing et al. | |
| 6,302,209 B1 | 10/2001 | Thompson, Sr. et al. | |
| 6,454,003 B1 * | 9/2002 | Chang ..................... C09K 8/512 166/270 |
| 6,592,718 B1 | 7/2003 | Wong Shing et al. | |
| 6,729,402 B2 | 5/2004 | Chang et al. | |
| 6,984,705 B2 | 1/2006 | Chang et al. | |
| 7,250,448 B2 | 7/2007 | Walchuk et al. | |
| 7,300,973 B2 | 11/2007 | Chang et al. | |
| 7,482,310 B1 | 1/2009 | Reese et al. | |
| 7,531,600 B1 | 5/2009 | Rey | |
| 7,700,702 B2 | 4/2010 | Gaillard et al. | |
| 7,833,944 B2 * | 11/2010 | Munoz et al. ................ 507/119 |
| 7,888,296 B2 | 2/2011 | Morris et al. | |
| 7,897,546 B2 | 3/2011 | Showalter et al. | |
| 7,902,127 B2 | 3/2011 | Kurian et al. | |
| 7,928,042 B2 | 4/2011 | Reed et al. | |
| 7,947,630 B2 | 5/2011 | Atkins et al. | |
| 7,989,401 B2 | 8/2011 | Kurian et al. | |
| 8,152,962 B2 | 4/2012 | Koch et al. | |
| 8,613,832 B2 | 12/2013 | Nyander et al. | |
| 8,871,692 B2 * | 10/2014 | Favero et al. ................ 507/225 |
| 9,120,965 B2 | 9/2015 | Kurian et al. | |
| 2003/0150575 A1 | 8/2003 | Hund et al. | |

(Continued)

FOREIGN PATENT DOCUMENTS

| | | |
|---|---|---|
| CN | 101148582 A | 3/2008 |
| CN | 103387637 A | 11/2013 |

(Continued)

OTHER PUBLICATIONS

Tillet et al. "Chemical reactions of polymer crosslinking and post-crosslinking at room and medium temperature" Progress in Polymer Science 36(2011) 191-217.*
CAS Database List CAS No. 58477-85-3 N,N'-diallyl-L-tartardiamide.*
EOR power point presentation presented during telephone interview Sep. 15, 2016.*
J. Phys. Chem. B, 2011, 115 (14), pp. 3761-3764.*
International Search Report and Written Opinion issued for PCT/US2014/011552, dated May 23, 2014, 18 pages.
International Search Report and Written Opinion issued for PCT/US2014/022627, dated Jul. 7, 2014, 10 pages.
Extended Search Report related to European Patent Application No. 14746670.0 dated Aug. 17, 2016, 6 pages.

(Continued)

*Primary Examiner* — Angela M DiTrani Leff
*Assistant Examiner* — Charles R Nold
(74) *Attorney, Agent, or Firm* — Stinson LLP

(57) ABSTRACT

Disclosed herein are water-soluble polymers comprising hydrolyzable cross-linked monomer units, and methods for recovering hydrocarbon fluids from a subterranean formation using the water-soluble polymers.

18 Claims, No Drawings

(56) References Cited

U.S. PATENT DOCUMENTS

| | | |
|---|---|---|
| 2003/0168192 A1 | 9/2003 | Mohammed |
| 2004/0040683 A1 | 3/2004 | Hund et al. |
| 2004/0209780 A1 | 10/2004 | Harris et al. |
| 2005/0150622 A1 | 7/2005 | Hund et al. |
| 2005/0161182 A1 | 7/2005 | Capwell |
| 2005/0272889 A1 | 12/2005 | Kiyosada et al. |
| 2006/0030493 A1 | 2/2006 | Segura |
| 2006/0142476 A1* | 6/2006 | Weerawarna ............ 525/54.1 |
| 2006/0243407 A1 | 11/2006 | Hund et al. |
| 2006/0270801 A1 | 11/2006 | Hagiopol et al. |
| 2007/0277981 A1 | 12/2007 | Robb et al. |
| 2009/0283232 A1 | 11/2009 | Hund et al. |
| 2010/0234251 A1 | 9/2010 | Robb et al. |
| 2011/0024128 A1 | 2/2011 | Kaminsky |
| 2011/0136704 A1 | 6/2011 | Sharma et al. |
| 2011/0155339 A1 | 6/2011 | Brungardt et al. |
| 2011/0247775 A1 | 10/2011 | Sutman et al. |
| 2012/0037364 A1 | 2/2012 | Guan et al. |
| 2012/0058922 A1 | 3/2012 | Favero et al. |
| 2012/0142847 A1 | 6/2012 | Yang et al. |
| 2012/0202941 A1 | 8/2012 | Broecher et al. |
| 2012/0264888 A1 | 10/2012 | Gu et al. |
| 2013/0005616 A1 | 1/2013 | Gaillard et al. |
| 2014/0102707 A1 | 4/2014 | Moradi-Araghi et al. |
| 2014/0144628 A1 | 5/2014 | Moradi-Araghi et al. |
| 2014/0174683 A1 | 6/2014 | Nyander et al. |
| 2014/0209304 A1 | 7/2014 | Reed et al. |
| 2014/0262090 A1 | 9/2014 | Brotherson et al. |
| 2014/0309368 A1* | 10/2014 | Blondel et al. ............ 524/801 |
| 2014/0323635 A1 | 10/2014 | Yang et al. |
| 2015/0267350 A1 | 9/2015 | Brotherson et al. |
| 2015/0337078 A1* | 11/2015 | Cochran ............ C08F 122/105 507/219 |

FOREIGN PATENT DOCUMENTS

| | | |
|---|---|---|
| EP | 0539289 B1 | 10/1996 |
| EP | 1 069 140 A1 | 1/2001 |
| EP | 1 207 267 A1 | 5/2002 |
| JP | 2011-226042 | 11/2011 |
| JP | 2011-226042 A | 11/2011 |
| WO | 2009/015255 A2 | 1/2009 |
| WO | 2009/131982 A1 | 10/2009 |
| WO | WO 2010133258 A1 | 11/2010 |

OTHER PUBLICATIONS

Written Opinion relating to PCT Application No. PCT/US2017/019096 dated May 22, 2017, 8 pages.

International Search Report relating to PCT Application No. PCT/US2017/019096 dated May 22, 2017, 6 pages.

CAS Database List—Chemical Book, N,N'-Diallyl-L-Tartardiamide, http://www.chemicalbook.com/ChemicalProductProperty_EN_CB1680601.html, Jun. 5, 2015, 3 pages.

Kot, E. et al., Novel Drag-Reducing Agents for Fracturing Treatments Based on Polyacrylamide Containing Weak Labile Links in the Polymer Backbone, Society of Petroleum Engineers 141257 (2011), 11 pages.

Tillet, Guillaume et al., Chemical reactions of polymer crosslinking and post-crosslinking at room and medium temperature, Progress in Polymer Science 36 (2011) pp. 191-217.

Kot, E. et al., Novel Drag-Reducing Agents for Fracturing Treatments Based on Polyacrylamide Containing Weak Labile Links in the Polymer Backbone, SPE 141257, Society of Petroleum Engineers (2011), pp. 1-11.

* cited by examiner

ENHANCED OIL RECOVERY USING MOBILITY CONTROL CROSSLINKED POLYMERS

CROSS-REFERENCE TO RELATED APPLICATIONS

This is a non-provisional of U.S. Patent Application No. 61/759,101, filed on Jan. 31, 2013, the contents of which are fully incorporated herein by reference.

TECHNICAL FIELD

The present invention relates to mobility control polymers for use in enhanced oil recovery methods. The polymers may be temporarily cross-linked via hydrolyzable cross-linkers.

BACKGROUND

In the recovery of oil from oil-bearing reservoirs, it is typically possible to recover only minor portions of the original oil in place by primary recovery methods which utilize only the natural forces present in the reservoir. Thus a variety of supplemental techniques have been developed and used to increase oil recovery. A commonly used secondary technique is waterflooding, which involves injection of water into the oil reservoir. As the water moves through the reservoir, it displaces oil therein to one or more production wells where the oil is recovered.

One problem encountered with waterflooding operations is the relatively poor sweep efficiency of the water, i.e., the water can channel through certain portions of the reservoir as it travels from the injection well(s) to the production well(s), thereby bypassing other portions of the reservoir. Poor sweep efficiency may be due, for example, to differences in the mobility of the water versus that of the oil, and permeability variations within the reservoir, which encourage flow through some portions of the reservoir and not others.

Various enhanced oil recovery techniques have been used to improve sweep efficiency. Aqueous solutions containing high molecular weight, water soluble polymers have been employed to improve sweep efficiency. These media are more viscous than ordinary water or brine, but often undergo molecular weight breakdown, degradation and shearing due to temperature, oxidative stress, and physical force of the wellbore. The degradation leads to reduced viscosity and reduced secondary and tertiary recovery rates of oil from subterranean formations.

SUMMARY OF THE INVENTION

The present invention is directed to water-soluble, shear-resistant, high molecular weight, cross-linked polymers for use in enhanced oil recovery operations from subterranean hydrocarbon-bearing formations (e.g., oil or petroleum bearing formations).

In one aspect, the invention is directed to a method for recovering a hydrocarbon fluid from a subterranean formation, comprising:
introducing into the formation an aqueous flooding fluid, the fluid comprising water and a water-soluble polymer having hydrolyzable cross-linked monomer units, the polymer comprising about 1 mol % to about 100 mol % acrylamide monomers, wherein, after introducing the aqueous flooding fluid into the formation, the hydrolyzable cross-linked monomer units are hydrolyzed to produce an aqueous flooding fluid after hydrolysis having a viscosity that is about the same or higher than a viscosity of the aqueous fluid prior to injection.

In some embodiments, the hydrolyzable cross-linked monomer units are ionically cross-linked via an ionic interaction between two monomer units. In some embodiments, the water-soluble polymer comprises from about 1 mol % to about 25 mol % ionically cross-linked monomer units. In some embodiments, the water-soluble polymer comprises at least one monomer unit having the following formula (I):

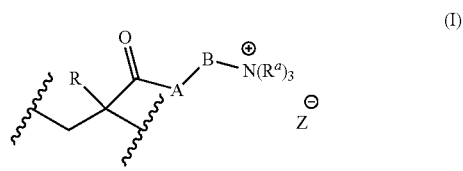

(I)

wherein:
R is selected from the group consisting of —H, $C_1$-$C_{24}$ alkyl, $C_2$-$C_{24}$ alkenyl and $C_2$-$C_{24}$ alkynyl;
each $R^a$ is independently selected from the group consisting of —H, optionally substituted $C_1$-$C_{50}$ alkyl, optionally substituted $C_2$-$C_{50}$ alkenyl, optionally substituted $C_2$-$C_{50}$ alkynyl and optionally substituted aryl;
A is selected from the group consisting of O, S and $NR^b$;
$R^b$ is selected from the group consisting of —H, optionally substituted $C_1$-$C_{24}$ alkyl, optionally substituted $C_2$-$C_{24}$ alkenyl and optionally substituted $C_2$-$C_{24}$ alkynyl;
B is selected from the group consisting of optionally substituted $C_1$-$C_{24}$ alkylenyl, optionally substituted $C_2$-$C_{24}$ alkenylenyl, optionally substituted $C_2$-$C_{24}$ alkynylenyl and optionally substituted $C_2$-$C_{24}$ heteroalkylenyl;
$Z^\ominus$ is an anion; and
each ⁓ represents a point of attachment to the polymer backbone.

In some embodiments, the monomer unit of formula (I) is derived from a monomer selected from the group consisting of N,N-dimethylaminoethyl acrylate methyl chloride quaternary salt, N,N-dimethylaminoethyl methacrylate methyl chloride quaternary salt, N,N-dimethylaminopropyl acrylamide methyl chloride quaternary salt, and N,N-dimethylaminopropyl methacrylamide methyl chloride quaternary salt. In some embodiments, the water-soluble polymer further comprises at least one anionic monomer unit derived from a monomer selected from the group consisting of an acrylic acid salt, a methacrylic acid salt, a 2-acrylamido-2-methylpropane sulfonic acid salt and a styrene sulfonic acid salt.

In some embodiments, the hydrolyzable cross-linked monomer units are covalently cross-linked. In some embodiments, the covalently cross-linked monomer units have the following formula (II):

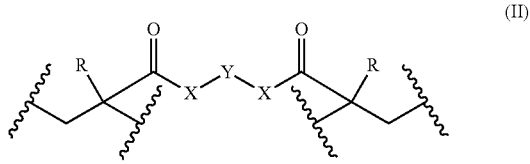

(II)

wherein:

each X is selected from the group consisting of O, S and $NR^b$;

each $R^b$ is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl;

each R is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl;

Y is selected from a group consisting of a bond and a linker comprising 1 to about 1000 member atoms; and each ～ represents a point of attachment to a first polymer backbone, and each ～ represents a point of attachment to the first polymer backbone or to a second polymer backbone.

In some embodiments, the covalently cross-linked monomer units have the following formula (IIa):

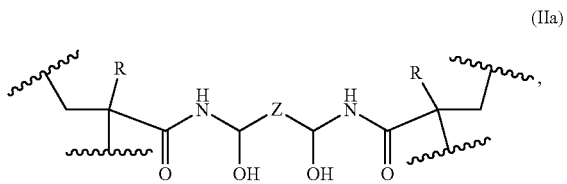

(IIa)

wherein:

each R is independently selected from the group consisting of —H and —$CH_3$;

Z is selected from the group consisting of a bond and a $C_1$-$C_{12}$ alkylenyl group; and each ～ represents a point of attachment to a first polymer backbone, and each ～ represents a point of attachment to the first polymer backbone or to a second polymer backbone.

In some embodiments, the covalently cross-linked monomer units have the following formula (IIb):

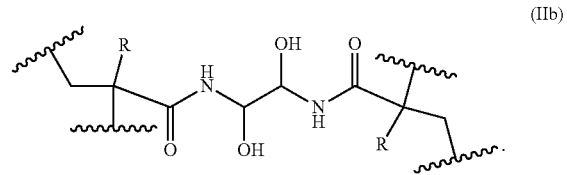

(IIb)

In some embodiments, the water-soluble polymer comprises about 0.1 ppm to about 20000 ppm covalently cross-linked monomer units. In some embodiments, the water-soluble polymer comprises about 0.1 ppm to about 100 ppm covalently cross-linked monomer units. In some embodiments, the aqueous flooding fluid comprises about 100 ppm to about 10000 ppm of the water-soluble polymer. In some embodiments, the aqueous flooding fluid further comprises a surfactant, a biocide, an antioxidant, or a combination thereof. In some embodiments, prior to injection, the aqueous flooding fluid has a viscosity of about 0 cPs to about 100 cPs. In some embodiments, after injection, the aqueous flooding fluid has a viscosity of about 1 cPs to about 5000 cPs. In some embodiments, the method further comprises displacing the hydrocarbon fluid in the formation into one or more production vessels.

In another aspect, the invention is directed to a method for recovering a hydrocarbon fluid from a subterranean formation, comprising: introducing into the formation an aqueous flooding fluid, the fluid comprising water and a water-soluble polymer, and having a viscosity of about 0 cPs to about 100 cPs, wherein, after introducing the aqueous flooding fluid into the formation, the viscosity of the aqueous flooding fluid increases to about 1 cPs to about 5000 cPs.

In some embodiments, the water-soluble polymer comprises about 1 mol % to about 100 mol % acrylamide monomers. In some embodiments, the water-soluble polymer comprises hydrolyzable cross-linked monomer units. In some embodiments, the aqueous flooding fluid comprises about 100 ppm to about 10000 ppm of the water-soluble polymer. In some embodiments, the aqueous flooding fluid further comprises a surfactant, a biocide, an antioxidant, or a combination thereof. In some embodiments, the method further comprises displacing the hydrocarbon fluid in the formation into one or more production vessels.

In another aspect, the invention provides a water-soluble polymer comprising about 1 mol % to about 100 mol % acrylamide monomers, and further comprising about 0.1 ppm to about 20000 ppm hydrolyzable cross-linked monomer units based on the weight of the water-soluble polymer.

In some embodiments, the covalently cross-linked monomer units have the following formula (II):

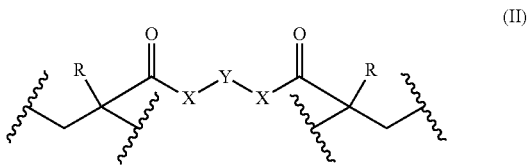

(II)

wherein:

each X is selected from the group consisting of O, S and $NR^b$;

each $R^b$ is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl;

each R is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl;

Y is selected from a group consisting of a bond and a linker comprising 1 to about 100 member atoms; and each ～ represents a point of attachment to a first polymer backbone, and each ～ represents a point of attachment to the first polymer backbone or to a second polymer backbone.

In some embodiments, the covalently cross-linked monomer units have the following formula (IIa):

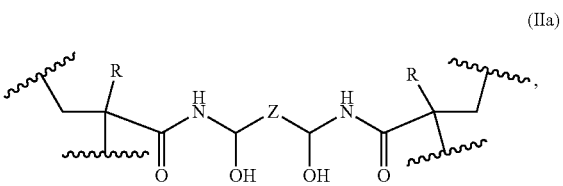

(IIa)

wherein:
each R is independently selected from the group consisting of —H and —CH$_3$;
Z is selected from the group consisting of a bond and a C$_1$-C$_{12}$ alkylenyl group; and
each ⁓ represents a point of attachment to a first polymer backbone, and each ⁓ represents a point of attachment to the first polymer backbone or to a second polymer backbone.

In some embodiments, the covalently cross-linked monomer units have the following formula (IIb):

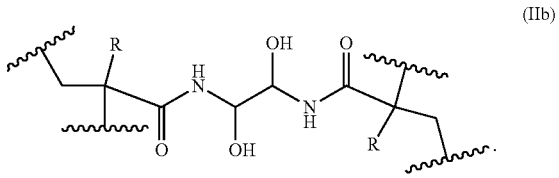

(IIb)

In some embodiments, the water-soluble polymer comprises about 0.1 ppm to about 20000 ppm covalently cross-linked monomer units. In some embodiments, the water-soluble polymer comprises about 0.1 ppm to about 100 ppm covalently cross-linked monomer units. In some embodiments, the composition comprises about 100 ppm to about 10000 ppm of the water-soluble polymer. In some embodiments, the composition further comprises a surfactant, a biocide, an antioxidant, or a combination thereof. In some embodiments, the composition has a viscosity of about 0 cPs to about 100 cPs.

In some embodiments, following exposure to a stimulus, the composition has a viscosity of about 1 cPs to about 5000 cPs. In some embodiments, the stimulus is an increase in temperature. In some embodiments, the stimulus is an increase in pH. In some embodiments, the stimulus is dilution in water.

DETAILED DESCRIPTION

The present invention is directed to water-soluble, shear-resistant, high molecular weight, cross-linked polymers for use in enhanced oil recovery operations from subterranean hydrocarbon-bearing formations (e.g., oil or petroleum bearing formations). In methods of recovering oil from subterranean formations, aqueous compositions containing the water-soluble polymers are introduced in a wellbore and into the subterranean hydrocarbon-bearing formation. The cross-linkers are hydrolyzable, allowing for changes in the viscosity of the composition following its injection into a subterranean formation. Aqueous compositions comprising the cross-linked water-soluble polymers may have a low viscosity prior to pumping the solution into a formation, allowing it to be easily injected into the formation at a high rate. The low-viscosity solution may be resistant to viscosity degradation induced by the high shear experienced during the injection. Once injected, however, the higher temperature and the longer residence time within the subterranean formation facilitates hydrolysis of the cross-linkers, which leads to an increase in viscosity of the solution, due to the increase in the hydrodynamic volume of the high molecular weight polymers that are un-crosslinked following hydrolysis. The viscosity of the resulting solution is higher than that of a solution comprising a near-identical polymer that lacks the hydrolyzable cross-links. The higher viscosity of the solution once in the formation allows for its effective use in achieving mobility control of the hydrocarbon in the formation, enhancing the secondary/tertiary recovery of hydrocarbon from the formation. The compositions of the invention thereby provide viscosities in formations after heat/time hydrolysis activation that far exceed those of previous hydrocarbon recovery polymers, which may degrade much more rapidly under the influence of shear during introduction via the wellbore.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

The term "alkyl," as used herein, refers to a linear or branched hydrocarbon radical, preferably having 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons. Alkyl groups include, but are not limited to, methyl, ethyl, n-propyl, isopropyl, n-butyl, iso-butyl, secondary-butyl, and tertiary-butyl. Alkyl groups may be unsubstituted or substituted by one or more suitable substituents, as defined below.

The term "alkylenyl" or "alkylene," as used herein, refers to a divalent group derived from a saturated, straight or branched hydrocarbon chain of from 1 to 50 carbon atoms. The term "C$_1$-C$_6$ alkylene" means those alkylene or alkylenyl groups having from 1 to 6 carbon atoms. Representative examples of alkylenyl groups include, but are not limited to, —CH$_2$—, —CH(CH$_3$)—, —CH(C$_2$H$_5$)—, —CH(CH(CH$_3$)(C$_2$H$_5$))—, —C(H)(CH$_3$)CH$_2$CH$_2$—, —C(CH$_3$)$_2$—, —CH$_2$CH$_2$—, —CH$_2$CH$_2$CH$_2$—, —CH$_2$CH$_2$CH$_2$CH$_2$—, and —CH$_2$CH(CH$_3$)CH$_2$—. Alkylenyl groups may be unsubstituted or substituted by one or more suitable substituents, as defined below.

The term "alkenyl," as used herein, refers to a straight or branched hydrocarbon radical, preferably having 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon double bonds. Alkenyl groups include, but are not limited to, ethenyl, 1-propenyl, 2-propenyl (allyl), iso-propenyl, 2-methyl-1-propenyl, 1-butenyl, and 2-butenyl. Alkenyl groups may be unsubstituted or substituted by one or more suitable substituents, as defined below.

The term "alkenylenyl" or "alkenylene," as used herein, refers to a divalent group derived from a straight or branched chain hydrocarbon of 2 to 50 carbon atoms, which contains at least one carbon-carbon double bond. Representative examples of alkenylenyl groups include, but are not limited to, —C(H)=C(H)—C(H)=C(H)—CH$_2$—CH$_2$—, —CH$_2$—C(H)=C(H)—CH$_2$—, —C(H)=C(H)—CH(CH$_3$)—, and —CH$_2$—C(H)=C(H)—CH(CH$_2$CH$_3$)—. Alkenylenyl groups may be unsubstituted or substituted by one or more suitable substituents, as defined below.

The term "alkynyl," as used herein, refers to a straight or branched hydrocarbon radical, preferably having 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon triple bonds. Alkynyl groups include, but are not limited to, ethynyl, propynyl, and butynyl. Alkynyl groups may be unsubstituted or substituted by one or more suitable substituents, as defined below.

The term "alkynylenyl" or "alkynylene," as used herein, refers to a divalent unsaturated hydrocarbon group derived from a straight or branched chain hydrocarbon of 2 to 50 carbon atoms, and which has at least one carbon-carbon triple bond. Representative examples of alkynylenyl groups include, but are not limited to, —C≡C—, —C≡C—CH$_2$—, —C≡C—CH$_2$—CH$_2$—, —CH$_2$—C≡C—CH$_2$—, —C≡C—CH(CH$_3$)—, and —CH$_2$—C≡C—CH(CH$_2$CH$_3$)—. Alkynylenyl groups may be unsubstituted or substituted by one or more suitable substituents, as defined below.

The term "alkoxy," as used herein, refers to an alkyl group, as defined herein, appended to the parent molecular moiety through an oxygen atom.

The term "aryl," as used herein, means monocyclic, bicyclic, or tricyclic aromatic radicals such as phenyl, naphthyl, tetrahydronaphthyl, indanyl and the like; optionally substituted by one or more suitable substituents, preferably 1 to 5 suitable substituents, as defined below.

The term "carbonyl," "(C=O)," or "—C(O)—" (as used in phrases such as alkylcarbonyl, alkyl —(C=O)— or alkoxycarbonyl) refers to the joinder of the >C=O moiety to a second moiety such as an alkyl or amino group (i.e. an amido group). Alkoxycarbonylamino (i.e. alkoxy(C=O)—NH—) refers to an alkyl carbamate group. The carbonyl group is also equivalently defined herein as (C=O). Alkylcarbonylamino refers to groups such as acetamide.

The term "cross-link," as used herein, refers to a bond that links one monomer unit of a polymer chain to another monomer unit of a polymer chain. The bond can be a covalent bond or an ionic bond.

The term "cycloalkyl," as used herein, refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1]heptanyl, bicyclo[3.2.1]octanyl and bicyclo[5.2.0]nonanyl, etc.); optionally containing 1 or 2 double bonds. Cycloalkyl groups may be unsubstituted or substituted by one or more suitable substituents, preferably 1 to 5 suitable substituents, as defined above.

The term "halo" or "halogen," as used herein, refers to a fluoro, chloro, bromo or iodo radical.

The term "heteroalkylenyl" or "heteroalkylene," as used herein, refers to a divalent group derived from a saturated, straight or branched hydrocarbon chain, in which at least one atom is a heteroatom such as O, S, N, Si or P. The terms "$C_1$-$C_{24}$ heteroalkylenyl," "$C_1$-$C_{12}$ heteroalkylenyl" and "$C_1$-$C_6$ heteroalkylene" refer to those heteroalkylene or heteroalkylenyl groups having from 1 to 24 atoms, 1 to 12 atoms or 1 to 6 member atoms, respectively, wherein the atoms are either carbon or a heteroatom. Representative examples of heteroalkylenyl groups include, but are not limited to, —O(CH$_2$CH$_2$O)$_n$— and —O(CH$_2$CH$_2$CH$_2$O)$_n$—, wherein each n is independently 1 to 12. Heteroalkylenyl groups may be unsubstituted or substituted by one or more suitable substituents, as defined below.

The term "heteroaryl," as used herein, refers to a monocyclic, bicyclic, or tricyclic aromatic heterocyclic group containing one or more heteroatoms selected from O, S and N in the ring(s). Heteroaryl groups include, but are not limited to, pyridyl, pyrazinyl, pyrimidinyl, pyridazinyl, thienyl, furyl, imidazolyl, pyrrolyl, oxazolyl (e.g., 1,3-oxazolyl, 1,2-oxazolyl), thiazolyl (e.g., 1,2-thiazolyl, 1,3-thiazolyl), pyrazolyl, tetrazolyl, triazolyl (e.g., 1,2,3-triazolyl, 1,2,4-triazolyl), oxadiazolyl (e.g., 1,2,3-oxadiazolyl), thiadiazolyl (e.g., 1,3,4-thiadiazolyl), quinolyl, isoquinolyl, benzothienyl, benzofuryl, and indolyl. Heteroaryl groups may be unsubstituted or substituted by one or more suitable substituents, preferably 1 to 5 suitable substituents, as defined below.

The term "heterocycle," as used herein, refers to a monocyclic, bicyclic, or tricyclic group containing 1 to 4 heteroatoms selected from N, O, S(O)$_n$, NH or NR$^X$, wherein IV is a suitable substituent. Heterocyclic groups optionally contain 1 or 2 double bonds. Heterocyclic groups include, but are not limited to, azetidinyl, tetrahydrofuranyl, imidazolidinyl, pyrrolidinyl, piperidinyl, piperazinyl, oxazolidinyl, thiazolidinyl, pyrazolidinyl, thiomorpholinyl, tetrahydrothiazinyl, tetrahydro-thiadiazinyl, morpholinyl, oxetanyl, tetrahydrodiazinyl, oxazinyl, oxathiazinyl, indolinyl, isoindolinyl, quinuclidinyl, chromanyl, isochromanyl, and benzoxazinyl. Examples of monocyclic saturated or partially saturated ring systems are tetrahydrofuran-2-yl, tetrahydrofuran-3-yl, imidazolidin-1-yl, imidazolidin-2-yl, imidazolidin-4-yl, pyrrolidin-1-yl, pyrrolidin-2-yl, pyrrolidin-3-yl, piperidin-1-yl, piperidin-2-yl, piperidin-3-yl, piperazin-1-yl, piperazin-2-yl, piperazin-3-yl, 1,3-oxazolidin-3-yl, isothiazolidinyl, 1,3-thiazolidin-3-yl, 1,2-pyrazolidin-2-yl, 1,3-pyrazolidin-1-yl, thiomorpholin-yl, 1,2-tetrahydrothiazin-2-yl, 1,3-tetrahydrothiazin-3-yl, tetrahydrothiadiazin-yl, morpholin-yl, 1,2-tetrahydrodiazin-2-yl, 1,3-tetrahydrodiazin-1-yl, 1,4-oxazin-2-yl, and 1,2,5-oxathiazin-4-yl. Heterocyclic groups may be unsubstituted or substituted by one or more suitable substituents, preferably 1 to 3 suitable substituents, as defined below.

The term "high molecular weight," as used herein in connection with a water-soluble polymer, refers to a polymer that has a molecular weight of at least about 500 kDa. In some embodiments, the term "high molecular weight" refers to a polymer that has a molecular weight of at least about 5000 kDa.

The term "hydrocarbon fluid," as used herein, refers to an organic compound consisting entirely of hydrogen and carbon. Hydrocarbons may be aromatic hydrocarbons (arenes), alkanes, alkenes, cycloalkanes and alkyne-based compounds. The majority of hydrocarbons found naturally occur in crude oil, where decomposed organic matter provides an abundance of carbon and hydrogen which, when bonded, can catenate to form seemingly limitless chains. Hydrocarbons may be saturated hydrocarbons (alkanes) composed entirely of single bonds and are saturated with hydrogen. The general formula for saturated hydrocarbons is $C_nH_{2n+2}$ (assuming non-cyclic structures). Saturated hydrocarbons are the basis of petroleum fuels and are found as either linear or branched species. Hydrocarbons with the same molecular formula, but different structural formulae are called structural isomers. As given in the example of 3-methylhexane and its higher homologues, branched hydrocarbons can be chiral. Chiral saturated hydrocarbons constitute the side chains of biomolecules such as chlorophyll and tocopherol. Hydrocarbons may be unsaturated hydrocarbons having one or more double or triple bonds between carbon atoms such as alkenes and alkynes as defined above. Hydrocarbons may be cycloalkanes, which are hydrocarbons containing one or more carbon rings to which hydrogen atoms are attached. Hydrocarbons may be aromatic hydrocarbons, also known as arenes, are hydrocarbons that have at least one aromatic ring. Hydrocarbons may be gases (e.g. methane and propane), liquids (e.g. hexane and benzene), waxes or low melting solids (e.g. paraffin wax and naphthalene) or polymers (e.g. polyethylene, polypropylene and polystyrene). Hydrocarbons may be a liquid hydrocarbon. The liquid hydrocarbon may be any type of liquid hydrocarbon including, but not limited to, crude oil, heavy oil, processed residual oil, bituminous oil, coker oils, coker gas oils, fluid catalytic cracker feeds, gas oil, naphtha, fluid catalytic cracking slurry, diesel fuel, fuel oil, jet fuel, gasoline, and kerosene.

The term "hydrodynamic volume," as used herein, refers to a measure of the size of the polymer in solution whereby the volume exerts a primary influence on the bulk viscosity of the solution of the polymer. Hydrodynamic volume may further refer to the volume of a polymer chain when it is in solution. This may vary for a polymer depending on how well it interacts with the solvent, and the polymer's molecular weight. The solvent properties can be influenced by the concentration and type of ionic species dissolved within the solvent.

The term "hydrolyzable," as used herein, refers to a bond or a moiety that can be cleaved by the addition of water.

The term "hydrolyzable cross-link," as used herein, refers to a cross-link as defined above that may be cleaved by hydrolysis (addition of water).

The term "hydroxy," as used herein, refers to an —OH group.

"Member atom" as used herein refers to a polyvalent atom (e.g., a C, O, N, S or P atom) in a chain or ring system that constitutes a part of the chain or ring. For example, in pyridine, five carbon atoms and one nitrogen atom are member atoms of the ring. In diethyl ether, four carbon atoms and one oxygen atom are member atoms of the chain. Member atoms will be substituted up to their normal valence. For example, in an alkylenyl chain, each carbon atom will be substituted with two hydrogen atoms, or one hydrogen atom and one other substituent (e.g., an alkyl group or a hydroxyl group), or two substituents (e.g., two alkyl groups). Alternatively, a carbon atom can be substituted with an oxo group to form a —C(O)— group.

The term "oxo," as used herein, refers to a double bonded oxygen (=O) radical wherein the bond partner is a carbon atom. Such a radical can also be thought as a carbonyl group.

The term "substituent," as used herein, is intended to mean a chemically acceptable functional group that is "substituted" at any suitable atom of that group. Suitable substituents include, but are not limited to halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, HO—(C=O)— groups, heterocylic groups, cycloalkyl groups, amino groups, alkyl- and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, arylsulfonyl groups, groups of formula —(OCH$_2$)$_t$OH wherein t is 1 to 25, and groups of formula -alkylenyl-(OCH$_2$)$_t$OH wherein t is 1 to 25. Those skilled in the art will appreciate that many substituents can be substituted with additional substituents.

The term "vessel," as used herein, refers to any suitable container that can receive a hydrocarbon fluid that is displaced from a subterranean formation. Examples of suitable vessels include but are not limited to pipelines, tanks, ships, floating production storage and offloading units (FPSOs), floating storage and offloading units (FSOs), or any unit that can transport or store a hydrocarbon fluid.

The term "viscosity," as used herein, expressed as the ratio of shear stress (force per unit area) to the shear rate (rate change of shear strain), refers to a fluid's resistance to flow. Viscosity may further be described as the internal friction of a moving fluid. A fluid with a high viscosity may resist motion because its molecular makeup provides significant internal friction. A fluid with low viscosity may flow easily because its molecular makeup results in very little friction when it is in motion.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. WATER-SOLUBLE POLYMERS

The present invention is directed to water-soluble mobility control polymers for use in enhanced oil recovery. The water-soluble polymers comprise hydrolyzable cross-linked monomer units. The hydrolyzable cross-linked monomer units are hydrolyzed upon exposure to a stimulus, such as a change in temperature or chemical environment (e.g., pH, concentration or ionic strength). For example, the water-soluble polymers may be incorporated into an aqueous flooding fluid, and may undergo hydrolysis after the aqueous flooding fluid is introduced into a subterranean formation. The hydrolyzable cross-linked monomer units may be cross-linked via a covalent hydrolyzable cross-linker, or via ionic interactions between a monomer unit bearing a charged hydrolyzable moiety and a monomer unit bearing an opposite charge.

When the polymers are dissolved in aqueous solution, they provide the aqueous polymer solution with significant shear resistance and also a relatively low viscosity. If the aqueous solution is subjected to altered conditions, such as introduction into a subterranean formation or to increased temperatures, the viscosity may increase to an amount greater than the starting solution viscosity, or an amount greater than the viscosity of an aqueous solution comprising the same polymer lacking the hydrolyzable cross-links.

The water-soluble polymers of the present invention comprise about 1 mol % to about 99 mol % acrylamide monomer units. For example, the polymer may comprise about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or 99 mol % acrylamide monomers. In some embodiments, the water-soluble polymers of the present invention comprise about 20 mol % to about 80 mol % acrylamide monomers. In some embodiments, the water-soluble polymers of the present invention comprise about 60 mol % to about 80 mol % acrylamide monomers.

The water-soluble polymer may comprise additional monomer units, which may be selected from the group consisting of: acrylic acid or a salt thereof, methacrylic acid or a salt thereof, 2-acrylamido-2-methylpropane sulfonic acid or a salt thereof, acrolein, styrene sulfonic acid or a salt thereof, N-vinyl formamide, N-vinyl pyrrolidone, N,N-dimethylaminoethyl acrylate or a quaternized salt thereof, N,N-dimethylaminoethyl methacrylate or a quaternized salt thereof, N,N-dimethylaminopropyl acrylamide or a quaternized salt thereof, N,N-dimethylaminopropyl methacrylamide or a quaternized salt thereof, N,N-dimethyldiallylammonium chloride, N,N-diallylamine, and a hydrophobic monomer such as lauryl methacrylate. For example, the water-soluble copolymer may further comprise monomer units selected from the group consisting of acrylic acid or a salt thereof, 2-acrylamido-2-methylpropane sulfonic acid or a salt thereof, acrolein, dimethylaminoethylacrylate methyl chloride quaternary salt (DMAEA.MCQ), and dimethylaminoethylmethacrylate methyl chloride quaternary salt (DMAEM.MCQ). If present, each of the above monomer units may be included in a polymer in an amount of about 1 mol % to about 99 mol %. For example, the polymer may comprise about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or 99 mol % of the above monomer units. In some embodiments, the water-soluble polymers of the present invention comprise about 10 mol % to about 60 mol % of the above monomer units. In some embodiments, the water-soluble polymers of the present invention comprise about 20 mol % to about 40 mol % of the above monomer units.

The water-soluble polymer of the invention may be a homopolymer (e.g., a homopolymer of acrylamide), or a copolymer or a terpolymer. In the case of copolymers and terpolymers, the polymer may be any form of copolymer or terpolymer, such as an alternating copolymer, a periodic copolymer, a random copolymer, or a block copolymer (e.g., a diblock copolymer or a triblock copolymer). The polymer may be a linear polymer or a branched polymer (e.g., a hyperbranched polymer or a dendritic polymer).

Following exposure of a solution comprising the water-soluble polymer to an external stimulus such as an increase in temperature or a change in chemical environment such as pH, concentration or ionic strength (e.g., following injection into a subterranean formation), and hydrolysis of any cross-linked monomer units, the water-soluble polymer of the invention may have a molecular weight of greater than about 500 kDa, or from about 500 kDa to about 50000 kDa, or from about 1000 kDa to about 25000 kDa. For example, a water-soluble polymer may have a molecular weight of about 500 kDa, 600 kDa, 700 kDa, 800 kDa, 900 kDa, 1000 kDa, 1100 kDa, 1200 kDa, 1300 kDa, 1400 kDa, 1500 kDa, 1600 kDa, 1700 kDa, 1800 kDa, 1900 kDa, 2000 kDa, 2100 kDa, 2200 kDa, 2300 kDa, 2400 kDa, 2500 kDa, 2600 kDa, 2700 kDa, 2800 kDa, 2900 kDa, 3000 kDa, 3100 kDa, 3200 kDa, 3300 kDa, 3400 kDa, 3500 kDa, 3600 kDa, 3700 kDa, 3800 kDa, 3900 kDa, 4000 kDa, 4100 kDa, 4200 kDa, 4300 kDa, 4400 kDa, 4500 kDa, 4600 kDa, 4700 kDa, 4800 kDa, 4900 kDa, 5000 kDa, 5100 kDa, 5200 kDa, 5300 kDa, 5400 kDa, 5500 kDa, 5600 kDa, 5700 kDa, 5800 kDa, 5900 kDa, 6000 kDa, 6100 kDa, 6200 kDa, 6300 kDa, 6400 kDa, 6500 kDa, 6600 kDa, 6700 kDa, 6800 kDa, 6900 kDa, 7000 kDa, 7100 kDa, 7200 kDa, 7300 kDa, 7400 kDa, 7500 kDa, 7600 kDa, 7700 kDa, 7800 kDa, 7900 kDa, 8000 kDa, 8100 kDa, 8200 kDa, 8300 kDa, 8400 kDa, 8500 kDa, 8600 kDa, 8700 kDa, 8800 kDa, 8900 kDa, 9000 kDa, 9100 kDa, 9200 kDa, 9300 kDa, 9400 kDa, 9500 kDa, 9600 kDa, 9700 kDa, 9800 kDa, 9900 kDa, 10000 kDa, 11000 kDa, 12000 kDa, 13000 kDa, 14000 kDa, 15000 kDa, 16000 kDa, 17000 kDa, 18000 kDa, 19000 kDa, 20000 kDa, 21000 kDa, 22000 kDa, 23000 kDa, 24000 kDa, 25000 kDa, 26000 kDa, 27000 kDa, 28000 kDa, 29000 kDa, 30000 kDa, 31000 kDa, 32000 kDa, 33000 kDa, 34000 kDa, 35000 kDa, 36000 kDa, 37000 kDa, 38000 kDa, 39000 kDa, 40000 kDa, 41000 kDa, 42000 kDa, 43000 kDa, 44000 kDa, 45000 kDa, 46000 kDa, 47000 kDa, 48000 kDa, 49000 kDa or 50000 kDa. Molecular weights may be higher than 50000 kDa in the event of that some of the cross-links remain unhydrolyzed.

Following injection into a subterranean formation and hydrolysis of any cross-linked monomer units, the water-soluble polymer of the invention may have a charge level (e.g., an anionic charge level) of about 10 to about 75 mol %. For example, a water-soluble polymer may have a charge level of about 10 mol %, 11 mol %, 12 mol %, 13 mol %, 14 mol %, 15 mol %, 16 mol %, 17 mol %, 18 mol %, 19 mol %, 20 mol %, 21 mol %, 22 mol %, 23 mol %, 24 mol %, 25 mol %, 26 mol %, 27 mol %, 28 mol %, 29 mol %, 30 mol %, 31 mol %, 32 mol %, 33 mol %, 34 mol %, 35 mol %, 36 mol %, 37 mol %, 38 mol %, 39 mol %, 40 mol %, 41 mol %, 42 mol %, 43 mol %, 44 mol %, 45 mol %, 46 mol %, 47 mol %, 48 mol %, 49 mol %, 50 mol %, 51 mol %, 52 mol %, 53 mol %, 54 mol %, 55 mol %, 56 mol %, 57 mol %, 58 mol %, 59 mol %, 60 mol %, 61 mol %, 62 mol %, 63 mol %, 64 mol %, 65 mol %, 66 mol %, 67 mol %, 68 mol %, 69 mol %, 70 mol %, 71 mol %, 72 mol %, 73 mol %, 74 mol %, or 75 mol %. In some embodiments, the water-soluble polymers of the present invention have a charge level of about 10 mol % to about 60 mol %. In some embodiments, the water-soluble polymers of the present invention have a charge level of about 10 mol % to about 40 mol %.

a. Hydrolyzable Ionic Cross-Links

The water-soluble polymers may include monomer units that are cross-linked via an ionic interaction, between a monomer unit bearing a charged hydrolyzable moiety, and a monomer unit bearing an opposite charge. For example, ionically cross-linked monomer units may include a monomer unit bearing a hydrolyzable positively charged moiety, such as a quaternary amine, which interacts with a negatively charged moiety on the polymer. In another example, ionically cross-linked monomer units may include a monomer unit bearing a hydrolyzable negatively charged moiety, such as a carboxylic acid, which interacts with a positively charged moiety on the polymer such as a quaternary amine.

For example, the water-soluble polymer may include at least one monomer-derived mer unit having the following formula (I):

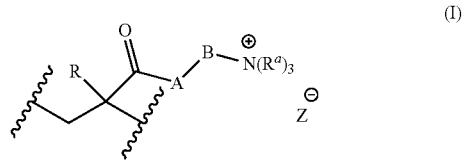

wherein:
R is selected from the group consisting of —H, $C_1$-$C_{24}$ alkyl, $C_2$-$C_{24}$ alkenyl and $C_2$-$C_{24}$ alkynyl;

each $R^a$ is independently selected from the group consisting of —H, optionally substituted $C_1$-$C_{50}$ alkyl, optionally substituted $C_2$-$C_{50}$ alkenyl, optionally substituted $C_2$-$C_{50}$ alkynyl and optionally substituted aryl;

A is selected from the group consisting of O, S and $NR^b$;

$R^b$ is selected from the group consisting of —H, optionally substituted $C_1$-$C_{24}$ alkyl, optionally substituted $C_2$-$C_{24}$ alkenyl and optionally substituted $C_2$-$C_{24}$ alkynyl;

B is selected from the group consisting of optionally substituted $C_1$-$C_{24}$ alkylenyl, optionally substituted $C_2$-$C_{24}$ alkenylenyl, optionally substituted $C_2$-$C_{24}$ alkynylenyl and optionally substituted $C_2$-$C_{24}$ heteroalkylenyl;

$Z^\ominus$ is an anion; and each ⌇⌇ represents a point of attachment to the polymer backbone.

In some embodiments, R is —H. In some embodiments, R is —$CH_3$. In some embodiments, A is O. In some embodiments, A is NH. In some embodiments, B is $C_2$ alkylenyl (i.e. —$CH_2$—$CH_2$—). In some embodiments, B comprises at least one ethylene glycol (i.e. —O—$CH_2$—$CH_2$—O—) or propylene glycol (i.e. —O—$CH_2$—$CH_2$—$CH_2$—O—) moiety. In some embodiments, each $R^a$ is —$CH_3$. $Z^\ominus$ is any suitable anion, such as a halide (e.g., fluoride, chloride, bromide or iodide), acetate, benzenesulfonate, benzoate, bicarbonate, nitrate, methanesulfonate, p-toluenesulfonate, or the like. In some embodiments, $Z^\ominus$ is chloride or methanesulfonate.

Exemplary hydrolyzable monomer units that include positively charged moieties are N,N-dimethylaminoethyl acrylate methyl chloride quaternary salt (DMAEA.MCQ), N,N-dimethylaminoethyl methacrylate methyl chloride quaternary salt (DMAEM.MCQ), N,N-dimethylaminopropyl acrylamide methyl chloride quaternary salt, and N,N-dimethylaminopropyl methacrylamide methyl chloride quaternary salt.

As an example of a hydrolyzable ionic cross-link, a monomer unit that is a DMAEA.MCQ or DMAEM.MCQ monomer unit may interact with an acrylate monomer unit to form an ionic cross-link. The ester moiety of the DMAEA.MCQ or DMAEM.MCQ may undergo hydrolysis to release the positively charged quaternary salt group, thereby breaking the cross-link.

Ionically cross-linked polymers may be prepared by polymerizing a mixture of monomers, which includes monomers bearing a charged hydrolyzable moiety, and monomer units bearing an opposite charge. For example, a polymer may be prepared by polymerizing a mixture comprising acrylamide monomers, acrylate monomers (e.g., sodium acrylate), and monomers having the following formula (Ia):

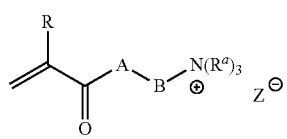

(Ia)

wherein:

R is selected from the group consisting of —H, $C_1$-$C_{24}$ alkyl, $C_2$-$C_{24}$ alkenyl and $C_2$-$C_{24}$ alkynyl;

each $R^a$ is independently selected from the group consisting of —H, optionally substituted $C_1$-$C_{50}$ alkyl, optionally substituted $C_2$-$C_{50}$ alkenyl, optionally substituted $C_2$-$C_{50}$ alkynyl and optionally substituted aryl;

A is selected from the group consisting of O, S and $NR^b$;

$R^b$ is selected from the group consisting of —H, optionally substituted $C_1$-$C_{24}$ alkyl, optionally substituted $C_2$-$C_{24}$ alkenyl and optionally substituted $C_2$-$C_{24}$ alkynyl;

B is selected from the group consisting of optionally substituted $C_1$-$C_{24}$ alkylenyl, optionally substituted $C_2$-$C_{24}$ alkenylenyl, optionally substituted $C_2$-$C_{24}$ alkynylenyl and optionally substituted $C_2$-$C_{24}$ heteroalkylenyl;

$Z^\ominus$ is an anion.

In some embodiments, R is —H. In some embodiments, R is —$CH_3$. In some embodiments, A is O. In some embodiments, A is NH. In some embodiments, B is $C_2$ alkylenyl (i.e. —$CH_2$—$CH_2$—). In some embodiments, B comprises at least one ethylene glycol (i.e. —O—$CH_2$—$CH_2$—O—) or propylene glycol (i.e. —O—$CH_2$—$CH_2$—$CH_2$—O—) moiety. In some embodiments, each $R^a$ is —$CH_3$. $Z^\ominus$ is any suitable anion, such as a halide (e.g., fluoride, chloride, bromide or iodide), acetate, benzenesulfonate, benzoate, bicarbonate, nitrate, methanesulfonate, p-toluenesulfonate, or the like. In some embodiments, $Z^\ominus$ is chloride or methanesulfonate.

Following polymerization to produce the ionically cross-linked polymer, the positively charged monomer units derived from the monomers of formula (Ia) will interact ionically with negatively charged monomer units derived from the acrylate monomers, to generate the ionic cross-link. When included in a water-soluble polymer, ionic cross-linked monomer units may be present in the polymer at an amount of about 1 mol % to about 25 mol %, or about 1 mol % to about 10 mol %, of the total monomer units in the polymer. For example, ionic cross-linked monomer units may be included in the polymer at an amount of about 1 mol %, 2 mol %, 3 mol %, 4 mol %, 5 mol %, 6 mol %, 7 mol %, 8 mol %, 9 mol %, 10 mol %, 11 mol %, 12 mol %, 13 mol %, 14 mol %, 15 mol %, 16 mol %, 17 mol %, 18 mol %, 19 mol %, 20 mol %, 21 mol %, 22 mol %, 23 mol %, 24 mol %, or 25 mol % of the total monomer units in the polymer.

b. Hydrolyzable Covalent Cross-Links

The polymers may include monomer units that are cross-linked via a covalent hydrolyzable cross-linker. As an example of a hydrolyzable covalent cross-linking, two monomer units may be cross-linked via a moiety that includes at least one hydrolyzable group such as an ester, carbonate, oxalate, acetal, hemiacetal, hemiaminal, or the like. The cross-linking moiety may include up to about 1000 member atoms, and may include linear and/or branched chains, ring structures, and optional substituents. Any suitable moiety capable of cross-linking two monomer units and having at least one hydrolyzable group may be used.

For example, the covalently cross-linked monomer units may have the following formula (II):

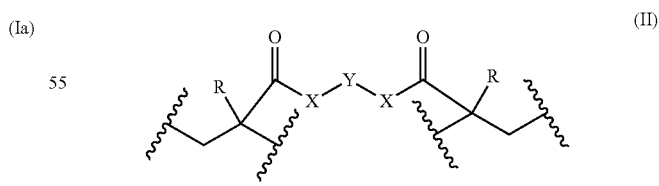

(II)

wherein:

each X is selected from the group consisting of O, S and $NR^b$;

each $R^b$ is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl;

each R is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl;

Y is selected from a group consisting of a bond and a linker comprising 1 to about 100 member atoms; and each ⌇ represents a point of attachment to a first polymer backbone, and each ⌇ represents a point of attachment to the first polymer backbone or a second polymer backbone.

In some embodiments, each X is O. In some embodiments, each X is NH. In some embodiments, Y is a bond. In some embodiments, Y is a $C_1$-$C_{30}$ alkylenyl group. In some embodiments, Y comprises at least one oxalate group. In some embodiments, Y comprises at least one carbonate group. In some embodiments, Y comprises at least one ethylene glycol moiety (i.e. —OCH$_2$CH$_2$O—). In some embodiments, Y comprises at least one propylene glycol moiety (i.e. —OCH$_2$CH$_2$CH$_2$O—).

For example, the covalently linked monomer units of formula (II) may have any of the following formulae: [third structure fixed, thank you]

wherein each m is 1, 2, 3, 4, 5, 6, 7, 8, 9, 10, 11 or 12; each n is 0, 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30; each p is 0 or 1; each R is independently selected from the group consisting of —H and —CH$_3$; and each $R^1$ is independently selected from the group consisting of —H and $C_1$-$C_{12}$ alkyl.

The covalently linked monomer units may have the following formula (IIa):

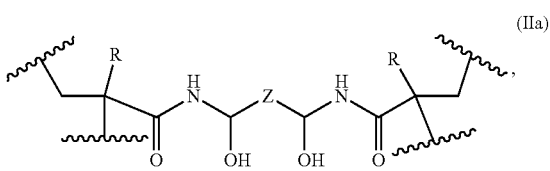

wherein:

each R is independently selected from the group consisting of —H and —CH$_3$;

Z is selected from the group consisting of a bond and a $C_1$-$C_{12}$ alkylenyl group; and each ⌇ represents a point of attachment to a first polymer backbone, and each ⌇ represents a point of attachment to the first polymer backbone or a second polymer backbone.

In an embodiment of formula (IIa), the covalently linked monomer units may have the following formula (IIb):

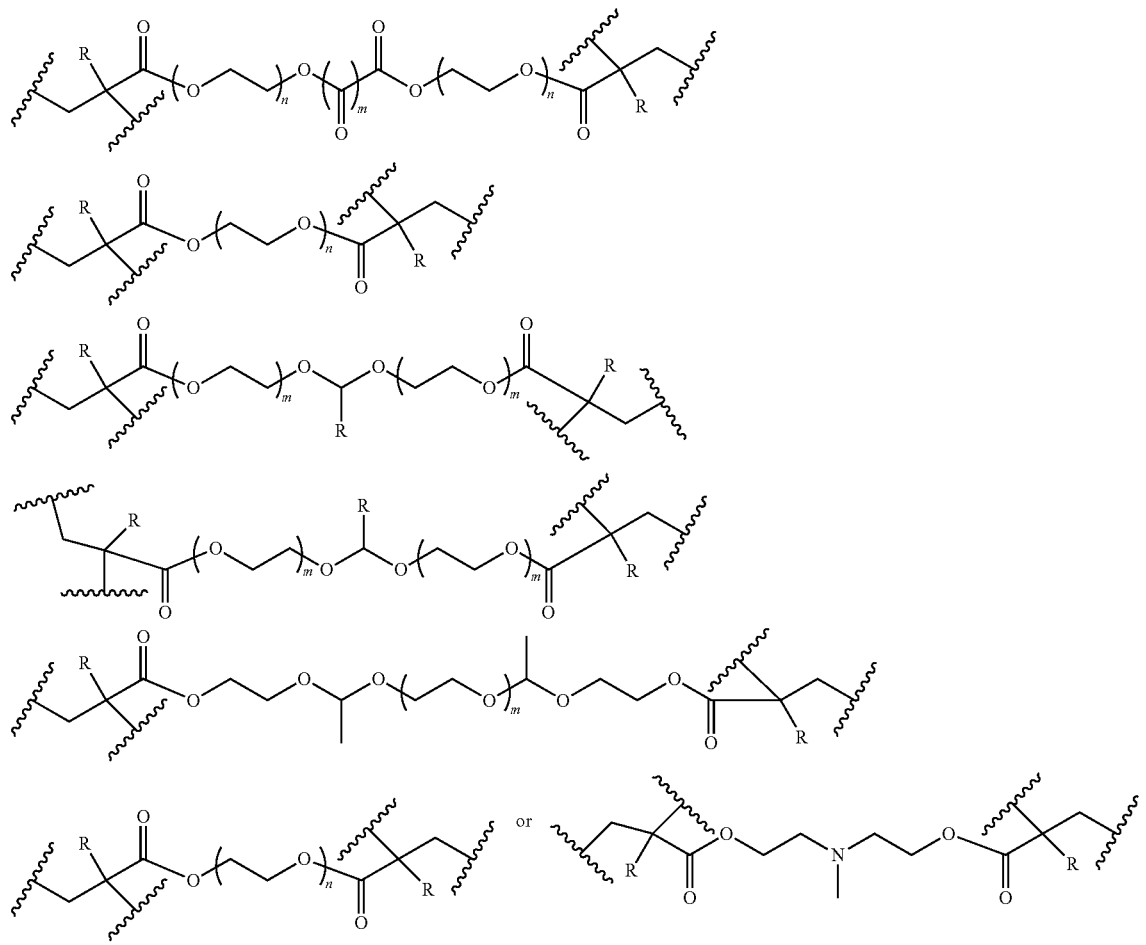

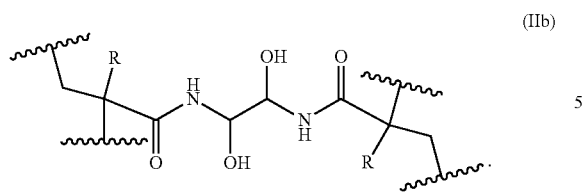

(IIb)

Other examples of cross-linked monomer units include those having phenylene groups, quaternary amine groups, carbonate groups, and the like. For example, covalently linked monomer units may have any of the following formulae:

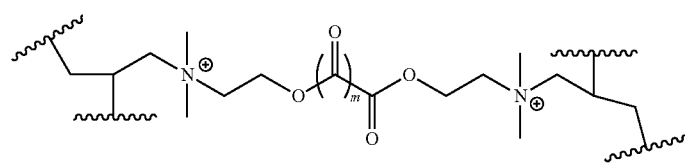

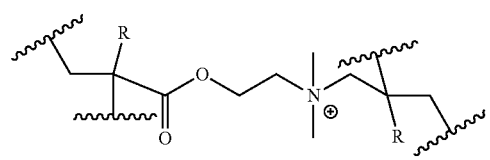

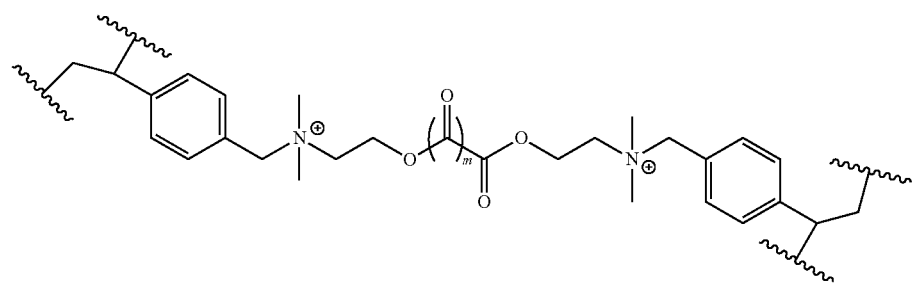

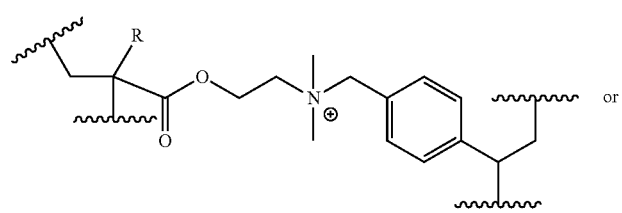

or

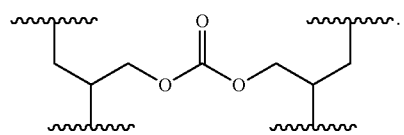

Other examples of cross-linked monomer units include those that provide more than two points of attachment to the backbone of the polymer chain. Examples of such cross-linked monomer units include the following:

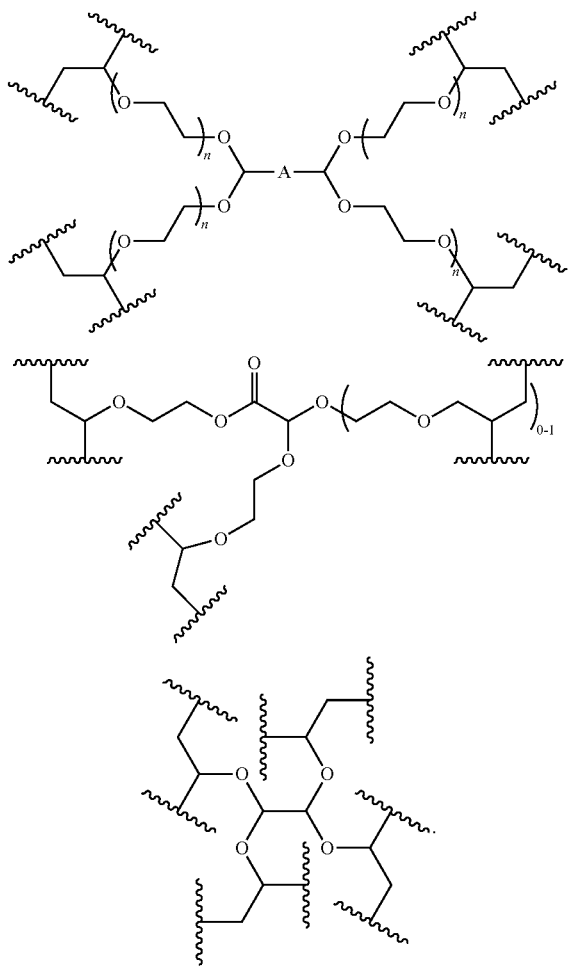

The above-identified cross-linked monomer units may be generated in a number of different ways. For example, two acrylamide or methacrylamide monomer units may be cross-linked by adding a dialdehyde compound to a solution of the polymer. Suitable dialdehyde compounds include but are not limited to glyoxal, glutaraldehyde, starch dialdehyde, or any compound having two or more aldehyde groups.

Alternatively, monomer units of the polymer may be cross-linked during the synthesis of the polymer, by including in the polymerization reaction a monomer having the following formula (III):

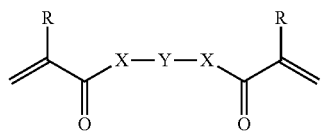

(III)

each X is selected from the group consisting of O, S and $NR^b$;

each $R^b$ is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl;

each R is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl; and Y is selected from a group consisting of a bond and a linker comprising 1 to about 100 member atoms.

The monomer of formula (III) may be formed immediately prior to the polymerization process, e.g., by adding a dialdehyde compound to a solution of an acrylamide or methacrylamide monomer immediately prior to the polymerization reaction. Alternatively, the monomer of formula (III) may be prepared in situ by adding a dialdehyde compound to a reaction mixture during the polymerization reaction.

An exemplary monomer unit may have the following formula (IIIa):

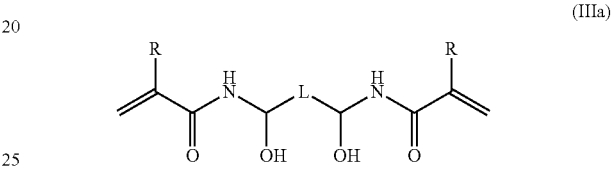

(IIIa)

wherein:

each R is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl; and L is selected from the group consisting of a bond and an optionally substituted $C_1$-$C_{12}$ alkylenyl group.

A particular example of a compound that can be included during synthesis of the polymer is N,N'-(1,2-dihydroxyethylene)bisacrylamide, also known as glyoxal bis(acrylamide). Glyoxal bis(acrylamide) may be added to the polymerization reaction, or it may be formed immediately prior to or during the polymerization process, by, for example, the addition of glyoxal to the polymerization reaction.

As another example, a direct hydrolyzable covalent bond may form between two monomer units. In such examples, a polymer having an acrylamide or methacrylamide monomer unit and an acrolein monomer unit may undergo a reaction to form a covalent bond, e.g., as follows:

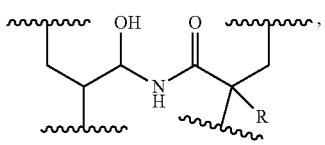

wherein R is selected from the group consisting of —H, optionally substituted $C_1$-$C_{24}$ alkyl, optionally substituted $C_2$-$C_{24}$ alkenyl and optionally substituted $C_2$-$C_{24}$ alkynyl, and each ∼∼∼ represents a point of attachment to a first polymer backbone, and each ∼∼∼ represents a point of attachment to the first polymer backbone or a second polymer backbone. In some embodiments, R is selected from the group consisting of —H and —$CH_3$.

In embodiments in which hydrolyzable covalently cross-linked monomer units are included in a polymer, either by including a bifunctional hydrolyzable monomer unit in the polymerization such as a compound of formula (III), or by adding a dialdehyde compound as a cross-linker, the crosslinked monomer units may be included in a polymer in an amount of about 0.1 ppm to about 20000 ppm based on the weight of the polymer. For example, the cross-linked monomer units may be included in a polymer in an amount of about 0.1 ppm to about 10000 ppm, about 0.1 ppm to about 5000 ppm, about 0.1 ppm to about 1000 ppm, or about 0.1 ppm to about 100 ppm. For example, the cross-linked monomer units may be included in a polymer in an amount of about 0.1 ppm, 0.2 ppm, 0.3 ppm, 0.4 ppm, 0.5 ppm, 0.6 ppm, 0.7 ppm, 0.8 ppm, 0.9 ppm, 1 ppm, 2 ppm, 3 ppm, 4 ppm, 5 ppm, 6 ppm, 7 ppm, 8 ppm, 9 ppm, 10 ppm, 20 ppm, 30 ppm, 40 ppm, 50 ppm, 60 ppm, 70 ppm, 80 ppm, 90 ppm, 100 ppm, 200 ppm, 300 ppm, 400 ppm, 500 ppm, 600 ppm, 700 ppm, 800 ppm, 900 ppm, 1000 ppm, 2000 ppm, 3000 ppm, 4000 ppm, 5000 ppm, 6000 ppm, 7000 ppm, 8000 ppm, 9000 ppm, 10000 ppm, 11000 ppm, 12000 ppm, 13000 ppm, 14000 ppm, 15000 ppm, 16000 ppm, 17000 ppm, 18000 ppm, 19000 ppm, or 20000 ppm.

c. Methods of Synthesis

The water-soluble polymers can be synthesized by any means known in the art, such as, for example, radical polymerization. For example, representative polymers can be prepared by the free radical polymerization of acrylamide and other vinyl monomers, including, optionally, a hydrolyzable crosslinking monomer (e.g., a compound of formula (Ia), or a compound of formula (III) or (IIIa), such as glyoxal bis(acrylamide)). Other additives can optionally be added, including ones that can form the desired hydrolyzable cross-links in the polymer prior to, during, or after the polymerization reaction.

In a typical synthesis, the monomer(s) are dissolved in water and the pH of the monomer solution is adjusted to a target level. The monomer solution is then purged with an inert gas such as nitrogen in order to remove all traces of oxygen, which would otherwise inhibit the free radical polymerization reaction. Optionally, the monomer solution can be suspended in an emulsion formed by the addition of a water-immiscible solvent such as a hydrocarbon oil, along with emulsifying surfactants such as sorbitan monooleate and/or ethoxylated sorbitan monostearates. Polymerization is then initiated via the addition of a small amount of a free radical initiator. The free radical initiators generally decompose to generate free radicals by thermal, photochemical, redox, or hybrid mechanisms. Examples of thermal initiators include, but are not limited to, azo compounds such as 2,2'-azobisisobutryonitrile. Examples of redox initiators include, but are not limited to, t-butylhydroperoxide/ferrous ion and ammonium persulfate/sodium bisulfite. The polymerization reaction is most often conducted between the temperatures of about 10° C. and about 110° C.

Once the polymerization reaction is completed, an optional step may be performed in order to reduce the residual monomer content of the product. This is accomplished, when desired, by means of heating the reaction product for an additional time period, or by the addition of additional initiators or other additives that will react with the residual monomer, or by a combination of both means. Additional processing steps can be optionally performed in order to, for example, adjust the product pH, or remove water or other solvents from the reaction product in order to produce a solid polymer product. The final polymer product form is thus dictated by the choice of the formula and the processing steps employed, so that a polymer product comprised of a liquid solution, a liquid emulsion, or a dry solid may be produced.

In an exemplary embodiment of formula (IIIa), the hydrolyzable crosslinker structure shown is comprised of a glyoxal-derived moiety and two acrylamide-derived moieties. This type of hydrolysable crosslink can be produced in the polymer by a variety of means, since the reaction used to form the crosslink can be carried out under reversible reaction conditions. For example, glyoxal bis(acrylamide) monomer, formed by a separate reaction between glyoxal and acrylamide, can be added as a comonomer to the polymerization reaction. Alternatively, glyoxal bis(acrylamide) can be formed in the polymerization reaction mixture immediately prior to polymerization, by the addition of glyoxal to the acrylamide-containing monomer reaction solution, under appropriate conditions. Alternatively, glyoxal can be added to the final reaction product after the polymerization reaction, where it can be expected to react with the polymer to form the desired hydrolyzable cross-links, under the appropriate conditions. One skilled in the art would recognize that any compound that generates glyoxal under these reaction conditions could also be used in place of glyoxal in these reactions. Such compounds include, but are not limited to, hydrolyzable polymers containing glyoxal, adducts formed from glyoxal and amines, adducts formed from glyoxal and amides, or acetals formed from glyoxal.

3. METHODS FOR RECOVERING HYDROCARBON FLUID FROM SUBTERRANEAN FORMATIONS

The present invention is directed to a method for recovering a hydrocarbon fluid from a subterranean formation. The method comprises introducing into the formation an aqueous flooding fluid as described below that has a low viscosity, yet the polymer is resistant to shear as it is introduced and migrating through the wellbore, but increases in viscosity once present in the subterranean formation thereby displacing the hydrocarbon fluid into one or more production vessels.

The invention may further be directed to method for recovering a hydrocarbon fluid from a subterranean formation, comprising (1) introducing into the formation an aqueous flooding fluid having a viscosity of about 0 cPs to about 100 cPs, wherein, after introducing the aqueous flooding fluid into the formation, the viscosity of the aqueous flooding fluid increases to about 1 cPs to about 5000 cPs; and (2) displacing the hydrocarbon fluid in the formation into one or more production vessels.

In order to effectively displace the hydrocarbon fluid from a subterranean formation using the method discussed above, the aqueous flooding fluid should have a sufficiently high viscosity. When injected into a subterranean formation, a low viscosity flooding fluid may seek a path of least resistance in the reservoir rock, and may therefore bypass large quantities of oil. By increasing the viscosity to a value approaching that of the oil, the mobility of the aqueous flooding fluid is decreased and more effectively displaces the oil from the formation. The aqueous flooding fluid of the present invention therefore comprises a high molecular weight water-soluble polymer which, once activated in the subterranean formation (as will be described further below), has a large hydrodynamic volume that exerts a primary influence on the bulk viscosity of the solution. The high bulk viscosity of the flooding fluid aids the displacement of the oil from the formation, ultimately into one or more production vessels.

While a high bulk viscosity is desirable once the aqueous flooding fluid is in the subterranean formation, high viscosity solutions are difficult to inject into the formation at a sufficiently high rate. Furthermore, water-soluble polymers may undergo significant shearing during the injection process, reducing the molecular weight and the hydrodynamic volume of the polymer, and the viscosity of the aqueous flooding fluid, which ultimately affects the displacement of oil. The present invention is thereby directed to an aqueous flooding fluid that comprises high molecular weight, shear-resistant polymers, which are temporarily crosslinked prior to injection of the aqueous flooding fluid into the subterranean formation. The temporary cross-linking via hydrolyzable cross-linkers temporarily reduces the hydrodynamic volume and thereby the solution viscosity prior to and during the introduction or injection of the aqueous flooding fluid into the subterranean formation. This reduction in viscosity allows for greater ease of injection down the wellbore, and also imparts significant shear resistance to the polymer.

Once the aqueous flooding fluid reaches the subterranean formations, the crosslinks hydrolyze over time, and after exposure to higher temperatures in the formation the cross-links further hydrolyze so that the high molecular weight polymers become uncrosslinked. The release of the cross-links results in an increase in the hydrodynamic volume, leading to a viscosity that is equal or greater than the viscosity of the aqueous flooding fluid prior to injection. The high viscosity aqueous flooding fluid can then effectively displace the hydrocarbons from the subterranean formation.

In some embodiments, the water-soluble polymer according to the invention may be activated prior to introduction into a subterranean formation. For example, an aqueous flooding fluid comprising hydrolyzable cross-linked monomer units may be exposed to a stimulus such as an increase in temperature or pH, or a decrease in concentration, to activate hydrolysis of the hydrolyzable cross-links. Such activation results in an increase in viscosity. The activated aqueous flooding fluid may subsequently be introduced into a subterranean formation in these embodiments.

a. Aqueous Flooding Fluid

The method employs an aqueous flooding fluid to displace the hydrocarbons from the subterraneous formation. The aqueous flooding fluid of the present invention comprises a water-soluble polymer as described above. In some embodiments of the present invention, the aqueous flooding fluid has an initial viscosity of about 0 cPs to about 100 cPs. After introducing the aqueous flooding fluid into a subterranean formation, the aqueous flooding fluid has a viscosity of about 1 cPs to about 5000 cPs. In some embodiments of the present invention, the aqueous flooding fluid comprises hydrolyzable cross-linked monomer units. The hydrolyzable cross-linked monomer units are hydrolyzed after the aqueous flooding fluid is introduced into a subterranean formation, and the viscosity of the solution following hydrolysis is about the same or higher than a viscosity of the composition prior to injection.

The water-soluble polymer may be included in an aqueous flooding fluid in an amount of about 100 ppm to about 10000 ppm. For example, the polymer may be included in the aqueous flooding fluid in an amount of about 100 ppm, 200 ppm, 300 ppm, 400 ppm, 500 ppm, 600 ppm, 700 ppm, 800 ppm, 900 ppm, 1000 ppm, 1100 ppm, 1200 ppm, 1300 ppm, 1400 ppm, 1500 ppm, 1600 ppm, 1700 ppm, 1800 ppm, 1900 ppm, 2000 ppm, 2100 ppm, 2200 ppm, 2300 ppm, 2400 ppm, 2500 ppm, 2600 ppm, 2700 ppm, 2800 ppm, 2900 ppm, 3000 ppm, 3500 ppm, 4000 ppm, 4500 ppm, 5000 ppm, 5500 ppm, 6000 ppm, 6500 ppm, 7000 ppm, 7500 ppm, 8000 ppm, 8500 ppm, 9000 ppm, 9500 ppm, or 10000 ppm. In some embodiments, the water-soluble polymer may be included in an aqueous flooding fluid in an amount of about 100 ppm to about 3000 ppm.

b. Viscosity

Prior to injection into a subterranean formation, an aqueous flooding fluid may have a viscosity of about 0 cPs to about 100 cPs. For example, the aqueous flooding fluid may have a viscosity of about 0 cPs, 0.001 cPs, 0.01 cPs, 0.1 cPs, 0.2 cPs, 0.3 cPs, 0.4 cPs, 0.5 cPs, 0.6 cPs, 0.7 cPs, 0.8 cPs, 0.9 cPs, 1 cPs, 2 cPs, 3 cPs, 4 cPs, 5 cPs, 6 cPs, 7 cPs, 8 cPs, 9 cPs, 10 cPs, 15 cPs, 20 cPs, 25 cPs, 30 cPs, 35 cPs, 40 cPs, 45 cPs, 50 cPs, 55 cPs, 60 cPs, 65 cPs, 70 cPs, 75 cPs, 80 cPs, 85 cPs, 90 cPs, 95 cPs or 100 cPs. In some embodiments, an aqueous flooding fluid may have a viscosity of about 0.001 cPs to about 100 cPs. In some embodiments, an aqueous flooding fluid may have a viscosity of about 0.01 cPs to about 100 cPs. In some embodiments, an aqueous flooding fluid may have a viscosity of about 0.1 cPs to about 20 cPs. In some embodiments, an aqueous flooding fluid may have a viscosity of about 0.1 cPs to about 10 cPs.

After exposure to a stimulus or a change in conditions such as temperature, pH, concentration, salt content or the like (e.g., introduction into a subterranean formation, or addition to synthetic sea water), the viscosity of the aqueous flooding fluid may be about the same or higher than a viscosity of the aqueous flooding fluid prior to the stimulus, or the viscosity may be about the same or higher than the viscosity of an aqueous flooding fluid comprising a corresponding water-soluble polymer that lacks the hydrolyzable cross-links. For example, after injection, the aqueous flooding fluid may have a viscosity of about 1 cPs to about 5000 cPs, e.g., 1 cPs, 5 cPs, 10 cPs, 20 cPs, 30 cPs, 40 cPs, 50 cPs, 60 cPs, 70 cPs, 80 cPs, 90 cPs, 100 cPs, 150 cPs, 200 cPs, 250 cPs, 300 cPs, 350 cPs, 400 cPs, 450 cPs, 500 cPs, 550 cPs, 600 cPs, 650 cPs, 700 cPs, 750 cPs, 800 cPs, 850 cPs, 900 cPs, 950 cPs, 1000 cPs, 1100 cPs, 1200 cPs, 1300 cPs, 1400 cPs, 1500 cPs, 1600 cPs, 1700 cPs, 1800 cPs, 1900 cPs, 2000 cPs, 2100 cPs, 2200 cPs, 2300 cPs, 2400 cPs, 2500 cPs, 2600 cPs, 2700 cPs, 2800 cPs, 2900 cPs, 3000 cPs, 3100 cPs, 3200 cPs, 3300 cPs, 3400 cPs, 3500 cPs, 3600 cPs, 3700 cPs, 3800 cPs, 3900 cPs, 4000 cPs, 4100 cPs, 4200 cPs, 4300 cPs, 4400 cPs, 4500 cPs, 4600 cPs, 4700 cPs, 4800 cPs, 4900 cPs, or 5000 cPs.

c. Filterability

Aqueous flooding fluids comprising the water-soluble polymers described above remain water-soluble following introduction into a subterranean formation. After injection into the formation, the environmental conditions of the formation cause the crosslinks in the water-soluble polymers described above to hydrolyze, providing a viscous aqueous flooding fluid. In order for the aqueous flooding fluid to improve the mobility of the oil in the formation and improve the sweep efficiency of the aqueous polymer flood, the water-soluble polymer providing viscosity to the flooding fluid must be able to move unimpeded through the formation, without blocking the pores of the formation. The desirable function of mobility control in enhanced oil recovery stands in contrast a different, polymer-aided EOR application called conformance control, in which polymers are injected in to the formation with the intent of forming crosslinked gels or insoluble polymers that block some of the pores in the formation. Such blocking of the pores improves the properties of the subterranean formation, instead of improving the properties of the aqueous flooding fluid.

Mobility control polymers, such as those described above, must therefore remain water soluble and not impede the flow of the aqueous flooding fluid in the formation. A recognized laboratory test to measure the ability of an aqueous flooding fluid to move through a subterranean formation without blocking the pores of the formation is called a filter ratio test. An example of this type of test is described in The American Petroleum Institute standards RP 63. In a filter ratio test, a standard volume of an aqueous flooding fluid containing a specific concentration of polymer is passed through a filter under a constant pressure. The time required for the solution to pass through the filter is recorded after specific volumes of solution have passed through the filter. The filter ratio is calculated as the ratio of the filter time for the final portion of solution, over the filter time for the initial, equal-sized portion of solution. Ideally, the aqueous flooding fluid should pass through the filter at a constant rate throughout the test, causing no pore-blocking during filtration, so that the filter ratio should be equal to one. The actual measured filter ratio is typically above one, however, so an upper limit to the filter ratio under a specific set of conditions is normally used in order to determine the suitability of an aqueous flooding fluid for use in a mobility control application.

d. Shear Resistance

The aqueous flooding fluid comprises the water-soluble polymers described above and exhibit enhanced shear resistance. Polymers used for mobility control in enhanced oil recovery are typically high molecular weight, non-crosslinked polymers that are sensitive to the shear forces experienced by the polymer-containing aqueous flooding fluid as it is injected into the formation, and as it travels into the formation near the wellbore. Any choke points in this high flow-velocity region can cause a shear-induced, mechanical degradation of the molecular weight of the polymer, resulting in an undesirable reduction in the viscosity of the aqueous flooding fluid. High molecular weight, viscous polymer solutions of the type desirable for mobility control are especially sensitive to shear degradation. Even if engineering measures are taken to minimize the shear degradation of the injected aqueous flooding fluid, a viscosity loss of up to 25% of the initial polymer viscosity upon shearing is not uncommon, and a much greater viscosity loss, up to about 80% or more, is possible.

The shear-induced degradation of the fluid viscosity can be measured using an industry recognized test such as that described in The American Petroleum Institute standards RP 63, where the aqueous flooding fluid is passed through a small orifice under high pressure. The difference in the fluid viscosity before and after the choke point is measured to indicate the amount of shear degradation of the flooding fluid viscosity. Alternatively, a simple blender test can be used to induce the shear degradation of the aqueous flooding fluid. The amount of viscosity loss experienced at increasing shear times in the blender can be measured and used to determine the relative shear stability of flooding fluids comprised of different types of polymers.

The aqueous flooding fluids comprising the water-soluble polymers of the present invention may display significant shear resistance. For example, when subjected to conditions of shear such as a blender test, the RP 63 standard test, or injection into a subterranean formation, the aqueous flooding fluids of the present invention may undergo a viscosity loss of less than 50%, less than 49%, less than 48%, less than 47%, less than 46%, less than 45%, less than 44%, less than 43%, less than 42%, less than 41%, less than 40%, less than 39%, less than 38%, less than 37%, less than 36%, less than 35%, less than 34%, less than 33%, less than 32%, less than 31%, less than 30%, less than 29%, less than 28%, less than 27%, less than 26%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11%, less than 10%, less than 9%, less than 8%, less than 7%, less than 6%, less than 5%, less than 4%, less than 3%, less than 2%, or less than 1%.

e. Additional Components

In addition to the water-soluble polymer, an aqueous flooding fluid may further optionally include one or more additives. Suitable additives include, but are not limited to, synergistic compounds, asphaltene inhibitors, paraffin inhibitors, corrosion inhibitors, scale inhibitors, emulsifiers, water clarifiers, dispersants, emulsion breakers, hydrogen sulfide scavengers, gas hydrate inhibitors, biocides, pH modifiers, surfactants, antioxidants and solvents.

f. Corrosion Inhibitors

The aqueous flooding fluid may further comprise a corrosion inhibitor. Suitable corrosion inhibitors include, but are not limited to, amidoamines, quaternary amines, amides, and phosphate esters.

g. Scale Inhibitors

The aqueous flooding fluid may further comprise a scale inhibitor. Suitable scale inhibitors include, but are not limited to, phosphates, phosphate esters, phosphoric acids, phosphonates, phosphonic acids, polyacrylamides, salts of acrylamido-methyl propane sulfonate/acrylic acid copolymer (AMPS/AA), phosphinated maleic copolymer (PHOS/MA), and salts of a polymaleic acid/acrylic acid/acrylamido-methyl propane sulfonate terpolymer (PMA/AMPS).

h. Emulsifiers

The aqueous flooding fluid may further comprise an emulsifier. Suitable emulsifiers include, but are not limited to, salts of carboxylic acids, products of acylation reactions between carboxylic acids or carboxylic anhydrides and amines, and alkyl, acyl and amide derivatives of saccharides (alkyl-saccharide emulsifiers).

i. Water Clarifiers

The aqueous flooding fluid may further comprise a water clarifier. Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

j. Dispersants

The aqueous flooding fluid may further comprise a dispersant. Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each N atom, at least 2 of the numbers of methylene groups in each phosphonate being different. Other suitable dispersion agents include lignin or derivatives of lignin such as lignosulfonate and naphthalene sulfonic acid and derivatives.

k. Emulsion Breakers

The aqueous flooding fluid may further comprise an emulsion breaker. Suitable emulsion breakers include, but are not limited to, dodecylbenzylsulfonic acid (DDBSA), the sodium salt of xylenesulfonic acid (NAXSA), epoxylated and propoxylated compounds, anionic cationic and nonionic surfactants, and resins, such as phenolic and epoxide resins.

l. Hydrogen Sulfide Scavengers

The aqueous flooding fluid may further comprise a hydrogen sulfide scavenger. Suitable additional hydrogen sulfide scavengers include, but are not limited to, oxidants (e.g., inorganic peroxides such as sodium peroxide, or chlorine dioxide), aldehydes (e.g., of 1-10 carbons such as formaldehyde or glutaraldehyde or (meth)acrolein), triazines (e.g., monoethanol amine triazine, and monomethylamine triazine), and glyoxal. In certain embodiments, blending the compounds and compositions of the invention with MMA triazines lowers or eliminates offensive MMA odors.

m. Gas Hydrate Inhibitors

The aqueous flooding fluid may further comprise a gas hydrate inhibitor. Suitable gas hydrate inhibitors include, but are not limited to, thermodynamic inhibitors (THI), kinetic inhibitors (KHI), and anti-agglomerates (AA). Suitable thermodynamic inhibitors include, but are not limited to, NaCl salt, KCl salt, $CaCl_2$ salt, $MgCl_2$ salt, $NaBr_2$ salt, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethyl ether, ethylene glycol monobutyl ether), and alkyl or cyclic esters of alcohols (such as ethyl lactate, butyl lactate, methylethyl benzoate). Suitable kinetic inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

n. Biocides

The aqueous flooding fluid may further comprise a biocide. Any biocide suitable in oilfield operations may be used. A biocide may be included in a composition in an amount of about 0.1 ppm to about 1000 ppm, e.g., 0.1 ppm, 0.5 ppm, 1 ppm, 2 ppm, 3 ppm, 4 ppm, 5 ppm, 6 ppm, 7 ppm, 8 ppm, 9 ppm, 10 ppm, 20 ppm, 30 ppm, 40 ppm, 50 ppm, 60 ppm, 70 ppm, 80 ppm, 90 ppm, 100 ppm, 200 ppm, 300 ppm, 400 ppm, 500 ppm, 600 ppm, 700 ppm, 800 ppm, 900 ppm, or 1000 ppm.

Suitable biocides include, but are not limited to, oxidizing and non-oxidizing biocides. Suitable non-oxidizing biocides include, for example amine-type compounds (e.g., quaternary amine compounds and cocodiamine), halogenated compounds (e.g., bronopol and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

o. pH Modifiers

The aqueous flooding fluid may further comprise a pH modifier. Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include NaOH, KOH, $Ca(OH)_2$, CaO, $Na_2CO_3$, $KHCO_3$, $K_2CO_3$, $NaHCO_3$, MgO, and $Mg(OH)_2$.

p. Surfactants

The aqueous flooding fluid may further comprise a surfactant. The surfactant may be a cationic surfactant, an anionic surfactant, an amphoteric surfactant, a zwitterionic surfactant or a non-ionic surfactant. In some embodiments, a surfactant may aid in improving the recovery of oil from the formation. A surfactant may be included in an aqueous flooding fluid in an amount of about 100 ppm to about 10000 ppm, e.g., 100 ppm, 200 ppm, 300 ppm, 400 ppm, 500 ppm, 600 ppm, 700 ppm, 800 ppm, 900 ppm, 1000 ppm, 2000 ppm, 3000 ppm, 4000 ppm, 5000 ppm, 6000 ppm, 7000 ppm, 8000 ppm, 9000 ppm, or 10000 ppm.

Suitable surfactants include, but are not limited to, anionic surfactants, cationic surfactants, and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono- and di-alkyl sulfosuccinates and sulfosuccinamates. Suitable anionic surfactants include alkyl or alkyl ether sulfates and sulfonates, such as $C_{14}$-$C_{24}$ alpha olefin sulfonates, $C_{13}$-$C_{18}$ alcohol ether sulfates, $C_{15}$-$C_{17}$ internal olefin sulfonates, and $C_{12}$-$C_{18}$ ester sulfonates. Cationic surfactants include alkyl trimethyl quaternary ammonium salts, alkyl dimethyl benzyl quaternary ammonium salts, dialkyl dimethyl quaternary ammonium salts, and imidazolinium salts. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopropionates and amphodipropionates, and alkyliminodipropionate.

q. Solvents

The aqueous flooding fluid may further comprise a solvent. Suitable solvents include, but are not limited to, water, isopropanol, methanol, ethanol, 2-ethylhexanol, heavy aromatic naphtha, toluene, ethylene glycol, ethylene glycol monobutyl ether (EGMBE), diethylene glycol monoethyl ether, and xylene. Representative polar solvents suitable for formulation with the composition include water, brine, seawater, alcohols (including straight chain or branched aliphatic such as methanol, ethanol, propanol, isopropanol, butanol, 2-ethylhexanol, hexanol, octanol, decanol, 2-butoxyethanol, etc.), glycols and derivatives (ethylene glycol, 1,2-propylene glycol, 1,3-propylene glycol, ethylene glycol monobutyl ether, etc.), ketones (cyclohexanone, diisobutylketone), N-methylpyrrolidinone (NMP), N,N-dimethylformamide and the like. Representative of non-polar solvents suitable for formulation with the composition include aliphatics such as pentane, hexane, cyclohexane, methylcyclohexane, heptane, decane, dodecane, diesel, and the like; aromatics such as toluene, xylene, heavy aromatic naphtha, fatty acid derivatives (acids, esters, amides), and the like.

In certain embodiments, the solvent is monoethyleneglycol, methanol, dimethyl sulfoxide (DMSO), dimethylformamide (DMF), tetrahydrofuran (THF), or a combination thereof.

In certain embodiments, a composition of the invention comprises from 0 to about 80 percent by weight of one or more solvents, based on the weight of the composition. In certain embodiments, a composition of the invention comprises from 0 to about 50 percent by weight of one or more solvents, based on the weight of the composition. In certain embodiments, a composition of the invention comprises 20%, 25%, 30%, 35%, 40%, 45%, or 50% by weight of one or more solvents, based on the weight of the composition.

r. Synergistic Compounds

The aqueous flooding fluid may further comprise a synergistic compound. Suitable synergistic compounds include compounds that enhance the hydrogen sulfide scavenging performance of the composition. In certain embodiments, the synergistic compound may be a quaternary ammonium compound, an amine oxide, an ionic or non-ionic surfactant, or any combination thereof. Suitable quaternary amine compounds include, but are not limited to, alkyl benzyl ammonium chloride, benzyl cocoalkyl($C_{12}$-$C_{18}$)dimethylammonium chloride, dicocoalkyl ($C_{12}$-$C_{18}$)dimethylammonium chloride, disallow dimethylammonium chloride, di(hydrogenated tallow alkyl)dimethyl quaternary ammonium methyl chloride, methyl bis(2-hydroxyethyl cocoalkyl($C_{12}$-$C_{18}$) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, and hydrogenated tallow alkyl (2-ethylhyexyl) dimethyl quaternary ammonium methyl sulfate. Suitable amine oxide compounds include, but are not limited to, fatty amine oxides such as stearyl dimethylamine oxide, lauryldimethylamine oxide, and cocamidopropylamine oxide, or etheramine oxides such as bis-(2-hydroxyethyl)isodecyloxypropylamine oxide. Suitable nonionic surfactants include, but are not limited to, polyoxyethylene glycol alkyl ethers, polyoxypropyleneglycol alkyl ethers, polyoxyethyleneglycol nonylphenol ethers, poloxamers, cocamide diethanolamine, and polyethoxylated tallow amine.

The synergist compound(s) may be present from about 0.01 to about 20 percent by weight. In certain embodiments, the synergistic compound is present from about 1 to about 10 percent by weight, from about 2 to about 9 percent by weight, from about 3 percent to about 8 percent by weight, from about 4 percent to about 7 percent by weight, or from about 5 percent to about 6 percent by weight. In certain embodiments, the synergist compound(s) may be added to a fluid or gas simultaneously with the aqueous flooding fluid, or may be added separately.

s. Asphaltene Inhibitors

The aqueous flooding fluid may further comprise an asphaltene inhibitor. Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

t. Paraffin Inhibitors

The aqueous flooding fluid may further comprise a paraffin inhibitor. Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable dispersants include, but are not limited to, dodecyl benzene sulfonate, oxyalkylated alkylphenols, and oxyalkylated alkylphenolic resins.

u. Antioxidants

In some embodiments, the aqueous flooding fluid may further comprise an antioxidant. Any antioxidant suitable in oilfield operations may be used. Exemplary antioxidants include but are not limited to sulfites, thiocyanates and thiosulfates. An antioxidant may be included in a composition in an amount of about 1 ppm to about 1000 ppm, e.g., 1 ppm, 2 ppm, 3 ppm, 4 ppm, 5 ppm, 6 ppm, 7 ppm, 8 ppm, 9 ppm, 10 ppm, 20 ppm, 30 ppm, 40 ppm, 50 ppm, 60 ppm, 70 ppm, 80 ppm, 90 ppm, 100 ppm, 200 ppm, 300 ppm, 400 ppm, 500 ppm, 600 ppm, 700 ppm, 800 ppm, 900 ppm, or 1000 ppm.

v. Additional Components

Compositions made according to the invention may further include additional functional agents or additives that provide a beneficial property. Additional agents or additives will vary according to the aqueous flooding fluid being manufactured and its intend use as one skilled in the art will appreciate.

The compounds, compositions, methods, and processes of the invention will be better understood by reference to the following examples, which are intended as an illustration of and not a limitation upon the scope of the invention.

4. EXAMPLES

The foregoing may be better understood by reference to the following examples, which are presented for purposes of illustration and are not intended to limit the scope of the invention. All reagents were purchased from commercial sources and used as received unless stated otherwise. N,N'-(1,2-dihydroxyethylene)bisacrylamide, also known as glyoxal bis(acrylamide) is abbreviated herein as GBA.

Example 1

Synthesis of Polymers 1a, 1b, 1c and 1d

Polymer 1a includes of 29 mole percent sodium acrylate, 71 mole percent acrylamide, and 3.5 ppm GBA hydrolyzable crosslinker (based on the total formula). The polymer was prepared by polymerizing a monomer emulsion consisting of an aqueous mixture of 25.0 g of 50% acrylamide, 5.39 g of acrylic acid, 16.00 g water, neutralized with 5.90 g 50% aqueous sodium hydroxide. In addition, 0.006 g of tetrasodium diethylenediaminetetraaacetate, and 0.026 g of a freshly-prepared 1% aqueous solution of (1,2-dihydroxyethylene)bisacrylamide (GBA) were added to the aqueous monomer solution The aqueous monomer solution was dispersed in an oil phase comprised of a solution of 21.00 g petroleum distillate, 1.0 g sorbitan monooleate and 0.61 g ethoxylated sorbitan monostearate.

The monomer emulsion was prepared by mixing the aqueous phase and the oil phase under shear for 30-60 minutes, followed by deoxygenation with nitrogen for 30 minutes. Polymerization is initiated by adding 2,2'-azobisisobutryonitrile at a reaction temperature of 45° C. The reaction temperature of the polymerization is maintained at 45° C. for 4 hours, then heated to 57° C. for an additional hour.

Dissolution of the polymer emulsion in water was effected by mixing the emulsion into a large volume of water under shear, in the presence of a high HLB nonionic surfactant at a level less than about 5% of the weight of the emulsion polymer.

The above procedure was also repeated at 1 kg and 2.4 kg scales, providing polymers 1b and 1c, respectively. Polymer 1d was prepared similarly.

Example 2

Preparation of Polymer 2

Polymer 2 was prepared by polymerizing a monomer emulsion consisting of an aqueous mixture of 24.9 g of 50% acrylamide, 4.6 g of N,N-dimethylaminoethyl acrylate methyl-chloride quaternary salt, 10.2 g water, neutralized with 0.078 g 50% aqueous sodium hydroxide. In addition, 0.006 g of tetrasodium diethylenediaminetetraaacetate, 0.54 g Adipic Acid, 1.79 g sodium chloride, 0.60 g urea, and 0.213 g of a freshly-prepared 0.1% aqueous solution of GBA were added to the aqueous monomer solution. The aqueous monomer solution was dispersed in an oil phase comprised of a solution of 15.57 g petroleum distillate, 0.73 g sorbitan monooleate and 0.73 g ethoxylated sorbitan monostearate. If necessary the monomer phase pH was adjusted to ~4 using 50% aqueous sodium hydroxide or concentrated hydrochloric acid.

The monomer emulsion was prepared by mixing the aqueous phase and the oil phase under shear for 30-60 minutes, followed by deoxygenation with nitrogen for 30 minutes. Polymerization was initiated by adding 0.0095 g 2,2'-azobisisobutryonitrile and 0.0012 g 2,2'-Azobis(2,4-Dimethyl Valeronitrile) at a reaction temperature of 45° C. The reaction temperature of the polymerization was maintained at 45° C. for 3 hours, then heated to 70° C. for an additional hour.

Dissolution of the polymer emulsion in water was effected by mixing the emulsion into a large volume of water under shear, in the presence of a high HLB nonionic surfactant at a level less than about 5% of the weight of the emulsion polymer.

Example 3

Preparation of Polymers 3a, 3b and 3c

Polymer 3a was prepared by polymerizing a monomer emulsion consisting of an aqueous mixture of 381.375 g of 50.20% acrylamide, 78.730 g of acrylic acid, and 178.050 g water which was neutralized in an ice-bath with 50% aqueous sodium hydroxide (86.500 g). In addition, 0.300 g of a freshly-prepared 2% aqueous solution of glyoxal was added to the aqueous monomer solution. The aqueous monomer solution was warmed and stirred for period sufficient for the required (1,2-dihydroxyethylene)bisacrylamide (GBA) to be formed in situ. 0.090 g of tetrasodium diethylenediaminetetraaacetate was then added to the prepared monomer phase.

The aqueous monomer solution was then dispersed in an oil phase comprised of a solution of 253.350 g petroleum distillate, 12.220 g sorbitan monooleate, and 7.300 g ethoxylated sorbitan monostearate.

The monomer emulsion was prepared by mixing the aqueous phase and the oil phase under shear for 30-60 minutes, followed by addition of 0.528 g of 2,2'-azobisisobutryonitrile and nitrogen purging. The reaction temperature of the polymerization was maintained at 44° C. for 3.5 hours with nitrogen purging and then heated to 57° C. for an additional hour.

Dissolution of the polymer emulsion in water is affected by mixing the emulsion into a large volume of water under shear, in the presence of a high HLB nonionic surfactant at a level less than about 5% of the weight of the emulsion polymer.

Polymers 3b and 3c were prepared following the same procedure using different levels of glyoxal in the formula: 0.600 g of a 2% glyoxal solution for 3b and 1.200 g of a 2% glyoxal solution for 3c.

Example 4

Preparation of Polymer 4

Polymer 4 was prepared by first preparing a 30 mol % sodium acrylate acrylamide emulsion copolymer using a similar method to Example 1, followed by post-treatment with glyoxal. A 100 g sample of a 30 mol % sodium acrylate acrylamide emulsion copolymer was treated under shear with 0.032 g of a 40% glyoxal solution. The mixture was stirred 15 minutes at 25° C. then stored without agitation for 24 hours at 40° C.

Dissolution of the polymer emulsion in water was affected by mixing the emulsion into a large volume of water under shear, in the presence of a high HLB nonionic surfactant at a level less than about 5% of the weight of the emulsion polymer.

Example 5

Preparation of Polymer 5

Polymer 5, a temporary ionic crosslinked emulsion polymer, was prepared by polymerizing a monomer emulsion consisting of an aqueous mixture of 25.00 g of 50% acrylamide, 4.30 g of acrylic acid, 16.21 g water, neutralized with 4.3 g 50% aqueous sodium hydroxide. In addition, 3.70 g of an 80% solution of N,N-dimethylaminoethyl acrylate, methyl chloride quaternary salt and 0.007 g of tetrasodium diethylenediaminetetraaacetate were added to the aqueous monomer solution. The aqueous monomer solution was then dispersed in an oil phase comprised of a solution of 21.00 g petroleum distillate, 1.01 g sorbitan monooleate, and 0.61 g ethoxylated sorbitan monostearate.

The monomer emulsion was prepared by mixing the aqueous phase and the oil phase under shear for 30-60 minutes, followed by deoxygenation with nitrogen for 30 minutes. Polymerization is initiated by adding 0.038 g 2,2'-azobisisobutryonitrile at a reaction temperature of 45° C. The reaction temperature of the polymerization is maintained at 45° C. for 4 hours and then heated to 58° C. for an additional hour.

Dissolution of the polymer emulsion in water was effected by mixing the emulsion into a large volume of water under shear, in the presence of a high HLB nonionic surfactant at a level less than about 5% of the weight of the emulsion polymer.

Example 6

Preparation of Polymer 6

Polymer 6, a diester crosslinked emulsion polymer, was prepared by polymerizing a monomer emulsion consisting of an aqueous mixture of 25.00 g of 50% acrylamide, 5.39 g of acrylic acid, 15.22 g water, neutralized with 5.90 g 50% aqueous sodium hydroxide. In addition, 0.784 g of a 0.1% solution of tetraethyleneglycol diacrylate crosslinker and 0.007 g of tetrasodium diethylenediaminetetraaacetate were added to the aqueous monomer solution. The aqueous monomer solution was then dispersed in an oil phase comprised of a solution of 19.00 g petroleum distillate, 0.917 g sorbitan monooleate, and 0.55 g ethoxylated sorbitan monostearate.

The monomer emulsion was prepared by mixing the aqueous phase and the oil phase under shear for 30-60 minutes, followed by deoxygenation with nitrogen for 30 minutes. Polymerization is initiated by adding 0.038 g 2,2'-azobisisobutryonitrile at a reaction temperature of 45° C. The reaction temperature of the polymerization is maintained at 45° C. for 4 hours, then heated to 58° C. for an additional hour.

Dissolution of the polymer emulsion in water was effected by mixing the emulsion into a large volume of water under shear, in the presence of a high HLB nonionic surfactant at a level less than about 5% of the weight of the emulsion polymer.

Example 7

Polymer Activation Procedures

The polymers were activated in order to increase the solution viscosity of the polymer solutions by heating or by changing the pH for a specified time period. The polymers could be activated either in the emulsion product form, or after make down of the emulsion to produce dilute polymer solutions. The viscosities of all polymer solutions were measured after the polymers were dissolved in 3.5 wt. % synthetic sea water at 3000 ppm polymer concentration by mixing the emulsion or dry polymer into a large volume of synthetic sea water under shear, in the presence of a high HLB nonionic surfactant at a level less than about 5% of the weight of the polymer. The unactivated and activated viscosities of the temporary crosslinked polymers produced according to examples 1-6 are shown in Tables I and II. For comparison, Tables I and II also include the viscosities of reference polymers subjected to the same activation procedures. The reference polymers 1, 2 and 3 are commercial 30 mole percent anionic polyacrylamides produced without the use of the temporary crosslinkers described herein. Reference polymer number 1 was used to produce polymer number 4.

Tables I and II demonstrate that the temporary crosslinked polymers of this invention can provide low viscosity aqueous polymer solutions initially, but upon activation by heat and/or a pH change, high viscosity polymer solutions are obtained.

TABLE I 3000 ppm polymer actives in 3.5 wt. % synthetic sea water Viscosity (cps) at a Shear rate of 10.2 s$^{-1}$

| Polymer | Unactivated viscosity | Activated viscosity | Activation Procedure |
|---|---|---|---|
| Reference Polymer 1 | 55.46 | 54.68 | Store 3000 ppm polymer solution unagitated 48 h at 40° C. |
| Reference Polymer 2 | 102.70 | 100.3 | Store 3000 ppm polymer solution unagitated 3 h at 70° C. |
| Reference Polymer 3 | 48.83 | 48.43 | Store 3000 ppm polymer solution unagitated 48 h at 40° C. |
| Polymer 1b | 10.15 | 123.8 | Store 3000 ppm polymer solution unagitated 2 h at 70° C. |
| Polymer 1c | 1.56 | 110.19 | Heat polymer emulsion for 3 h at 70° C. with mixing |
| Polymer 1c | 1.56 | 133.64 | Raise pH above 8 with 0.5% Na$_2$CO$_3$ and heat polymer emulsion for 3 h at 70° C. with mixing |
| Polymer 1d | 7.90 | 153.87 | Store 3000 ppm polymer solution of pH 12 unagitated for 6 h at room temperature after makedown |
| Polymer 2 | 6.25 | 24.21 | Store 3000 ppm polymer solution unagitated 48 h at 50° C. |
| Polymer 3a | 0.00 | 127.71 | Store 3000 ppm polymer solution unagitated 25 h at 70° C. |
| Polymer 3a | 0.00 | 142.28 | Store 3000 ppm polymer solution 33 days at 50° C. |
| Polymer 3b | 0.00 | 144.89 | Store 3000 ppm polymer solution unagitated 25 h at 70° C. |
| Polymer 3b | 0.00 | 141.38 | Store 3000 ppm polymer solution 33 days at 50° C. |
| Polymer 3c | 0.00 | 111.69 | Store 3000 ppm polymer solution 45 h at 70° C. |
| Polymer 3c | 0.00 | 148.41 | Store 3000 ppm polymer solution 32 days at 50° C. |
| Polymer 4 | 2.34 | 20.31 | Store 3000 ppm polymer solution unagitated 48 h at 40° C. |
| Polymer 5 | 18.75 | 63.2 | Store 3000 ppm polymer solution unagitated 3 h at 70° C. |
| Polymer 6 | 11.32 | 16.4 | Store 3000 ppm polymer solution unagitated 3 h at 70° C. |

Table II demonstrates that the heat activation process can occur over a variety of temperatures, displaying a higher activation rate as the temperature is increased. As expected, reference polymer #1 provides no significant heat activation over the range of temperatures and times tested.

TABLE II

Heat Activation of Polymer # 6 (3000 ppm in Synthetic Sea Water)

| Polymer #6 | | | Reference Polymer #1 | | |
|---|---|---|---|---|---|
| Temp (° C.) | Time (h) | BV (cPs) | Temp (° C.) | Time (h) | BV (cPs) |
| 22 | 0 | 18.75 | 22 | 0 | 60.53 |
|  | 23 | 28.12 | 22 | 28 | 64.44 |
|  | 48 | 45.3 |  |  |  |
|  | 120 | 64.8 |  |  |  |
| 40 | 0.00 | 18.75 | 40 | 0 | 60.53 |
|  | 1.00 | 21.85 |  |  |  |
|  | 1.92 | 23.43 |  |  |  |
|  | 2.83 | 31.24 |  |  |  |
|  | 4.00 | 33.59 |  |  |  |
|  | 5.25 | 48.43 |  |  |  |
|  | 6.00 | 54.29 |  |  |  |
|  | 23.00 | 95 | 40 | 23 | 62.88 |
|  | 72.00 | 65.62 | 40 | 72 | 54.33 |
| 70 | 0.00 | 18.75 | 70 | 0 | 60.53 |
|  | 0.40 | 24.99 |  |  |  |
|  | 0.83 | 61.71 |  |  |  |

TABLE II-continued

Heat Activation of Polymer # 6 (3000 ppm in Synthetic Sea Water)

| Polymer #6 | | | Reference Polymer #1 | | |
|---|---|---|---|---|---|
| Temp (° C.) | Time (h) | BV (cPs) | Temp (° C.) | Time (h) | BV (cPs) |
| | 1.00 | 63.27 | | | |
| | 15.00 | 59.6 | 70 | 15 | 58.7 |

Example 8

Shear Stability of Unactivated, Temporary Crosslinked Polymers

Table III demonstrates that the unactivated form of the temporary crosslinked polymers of this invention protect the polymer against shear-induced degradation of the polymer solution viscosity. To measure the shear stability, freshly prepared 3,000 ppm polymer solutions in synthetic sea water were sheared for 0-40 seconds using an Oster blender. The solution viscosity each sample was measured after each shear time period. For the temporary crosslinked polymers (Polymers 1b and 6), each sheared solution was then heat activated for 2 hours at 70° C., and then the solution viscosities were measured again.

When subjected to shear before heat-activation, Polymer 1b and Polymer 6 are resistant to shear degradation, and provide viscosities after heat activation that far exceed those of the reference polymers, which degrade much more rapidly under the influence of shear.

TABLE III

Shear Resistance of Covalently Temporary Crosslinked Polymer (Polymer 1b)

| | Polymer 1b BV (cPs) | | Reference Polymer 1 |
|---|---|---|---|
| Shear Time (s) | 22° C. | 22° C. + 70° C./2 h | BV 22° C. |
| 0 | 10.15 | 123.8 | 65.61 |
| 5 | 7.03 | 118.08 | 37.88 |
| 10 | 7.03 | 142.44 | 27.73 |
| 20 | 6.25 | 91.39 | 17.96 |
| 40 | 4.69 | 62.49 | 12.11 |

Example 9

Filter Ratio Test

The apparatus used to measure the filter ratio of flooding fluids was constructed of a 2 inch inner diameter plastic cylinder fitted with a gasket-sealed top possessing fittings for nitrogen pressurization and a gasket-sealed bottom connected to a filter and outlet. The filter pore diameter was 2.5 microns. 200 grams of a 3000 ppm solution in synthetic sea water of polymer 1a was added to the cylinder. After a few mLs of solution were allowed to pass through in order to wet the filter, the time required for an initial 30 mL volume of solution to pass through the filter, under a head pressure of 20 psi, was measured. Then about 100 mL additional solution was allowed to pass through the filter. Finally, the time required for a final 30 mL solution to pass through the filter was measured. The ratio of the final to initial filter times was recorded as the filter ratio. The filter ratio of a 3000 ppm solution of a freshly made-down polymer 1a was 1.23. After activation of the polymer solution by heating to 70° C. for three hours, the filter ratio was measured again and found to be 1.16.

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

The invention claimed is:

1. A method for recovering a hydrocarbon fluid from a subterranean formation, comprising:
    injecting into the formation an aqueous flooding fluid, the aqueous flooding fluid comprising water and a cross-linked water-soluble polymer having hydrolyzable cross-linked monomer units, the polymer comprising about 1 mol % to 100 mol % acrylamide monomers and at least one anionic monomer unit derived from a monomer selected from the group consisting of an acrylic acid salt, a methacrylic acid salt, a 2-acrylamido-2-methylpropane sulfonic acid salt and a styrene sulfonic acid salt, wherein, after injecting the aqueous flooding fluid into the formation, the hydrolyzable cross-linked monomer units are hydrolyzed to produce an un-crosslinked water-soluble polymer in the aqueous flooding fluid, wherein after hydrolysis of the hydrolyzable cross-linked monomer units, the aqueous flooding fluid has a viscosity that is higher than a viscosity of the aqueous fluid prior to injection into the formation and the un-crosslinked water-soluble polymer moves throughout the formation without blocking pores of the formation, thereby providing mobility control of the hydrocarbon fluid in the formation, wherein the hydrolyzable cross-linked monomer units are ionically cross-linked via an ionic interaction between two monomer units.

2. The method of claim 1, wherein the water-soluble polymer comprises from about 1 mol % to about 25 mol % ionically cross-linked monomer units.

3. The method of claim 1, wherein the water-soluble polymer comprises at least one monomer unit having the following formula (I):

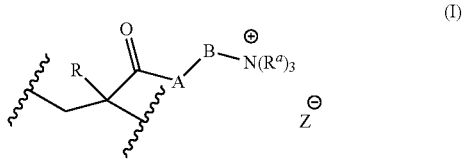

(I)

wherein:
R is selected from the group consisting of H, $C_1$-$C_{24}$ alkyl, $C_2$-$C_{24}$ alkenyl and $C_2$-$C_{24}$ alkynyl;
each $R^a$ is independently selected from the group consisting of H, unsubstituted or substituted $C_1$-$C_{50}$ alkyl, unsubstituted or substituted $C_2$-$C_{50}$ alkenyl, unsubstituted or substituted $C_2$-$C_{50}$ alkynyl and unsubstituted or substituted aryl;

A is selected from the group consisting of O and $NR^b$;

$R^b$ is selected from the group consisting of —H, unsubstituted or substituted $C_1$-$C_{24}$ alkyl, unsubstituted or substituted $C_2$-$C_{24}$ alkenyl and unsubstituted or substituted $C_2$-$C_{24}$ alkynyl;

B is selected from the group consisting of unsubstituted or substituted $C_2$-$C_{24}$ alkylenyl, unsubstituted or substituted $C_2$-$C_{24}$ alkenylenyl, unsubstituted or substituted $C_2$-$C_{24}$ alkynylenyl and unsubstituted or substituted $C_2$-$C_{24}$ heteroalkylenyl;

$Z^⊖$ is an anion; and each ⌇ represents a point of attachment to the polymer backbone.

4. The method of claim 3, wherein the monomer unit of formula (I) is derived from a monomer selected from the group consisting of N,N-dimethylaminoethyl acrylate methyl chloride quaternary salt, N,N-dimethylaminoethyl methacrylate methyl chloride quaternary salt, N,N-dimethylaminopropyl acrylamide methyl chloride quaternary salt, and N,N-dimethylaminopropyl methacrylamide methyl chloride quaternary salt.

5. A method for recovering a hydrocarbon fluid from a subterranean formation, comprising:

injecting into the formation an aqueous flooding fluid comprising water and a cross-linked water-soluble polymer having hydrolyzable cross-linked monomer units, the polymer comprising about 1 mol % to 100 mol % acrylamide monomers and at least one anionic monomer unit derived from a monomer selected from the group consisting of an acrylic acid salt, a methacrylic acid salt, a 2-acrylamido-2-methylpropane sulfonic acid salt and a styrene sulfonic acid salt, wherein, after injecting the aqueous flooding fluid into the formation, the hydrolyzable cross-linked monomer units are hydrolyzed to produce an un-crosslinked water-soluble polymer in the aqueous flooding fluid after hydrolysis of the hydrolyzable cross-linked monomer units, the aqueous flooding fluid has a viscosity that is higher than a viscosity of the aqueous fluid prior to injection into the formation and the un-crosslinked water-soluble polymer moves throughout the formation without blocking pores of the formation, thereby providing mobility control of the hydrocarbon fluid in the formation, wherein the cross-linked monomer units are covalently cross-linked and have the following formula (II):

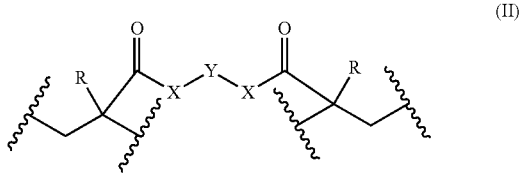

(II)

wherein:
each X is selected from the group consisting of O and $NR^b$;
each $R^b$ is independently selected from the group consisting of —H, unsubstituted or substituted $C_1$-$C_{24}$ alkyl, unsubstituted or substituted $C_2$-$C_{24}$ alkenyl and unsubstituted or substituted $C_2$-$C_{24}$ alkynyl;

each R is independently selected from the group consisting of —H, unsubstituted or substituted $C_1$-$C_{24}$ alkyl, unsubstituted or substituted $C_2$-$C_{24}$ alkenyl and unsubstituted or substituted $C_2$-$C_{24}$ alkynyl;

Y is selected from a group consisting of a bond and a linker comprising 1 to about 1000 member atoms; and each ⌇ represents a point of attachment to a first polymer backbone, and each ⌇ represents a point of attachment to the first polymer backbone or to a second polymer backbone.

6. The method of claim 5, wherein the covalently cross-linked monomer units have the following formula (IIa):

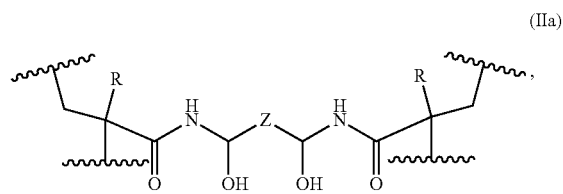

(IIa)

wherein:
each R is independently selected from the group consisting of —H and —$CH_3$;
Z is selected from the group consisting of a bond and a $C_1$-$C_{12}$ alkylenyl group; and
each ⌇ represents a point of attachment to a first polymer backbone, and each ⌇ represents a point of attachment to the first polymer backbone or to a second polymer backbone.

7. The method of claim 6, wherein the covalently cross-linked monomer units have the following formula (IIb):

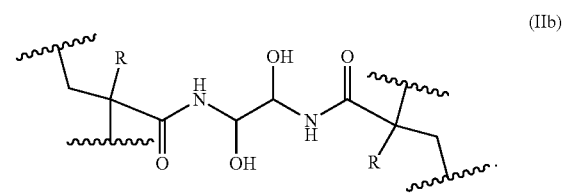

(IIb)

8. The method of claim 7, wherein the water-soluble polymer comprises about 0.1 ppm to about 20,000 ppm covalently cross-linked monomer units.

9. The method of claim 7, wherein the water-soluble polymer comprises about 0.1 ppm to about 100 ppm covalently cross-linked monomer units.

10. The method of claim 7, wherein the aqueous flooding fluid comprises about 100 ppm to about 10,000 ppm of the water-soluble polymer.

11. The method of claim 7, wherein the aqueous flooding fluid further comprises a surfactant, a biocide, an antioxidant, or a combination thereof.

12. The method of claim 7, wherein prior to injection, the aqueous flooding fluid has a viscosity of 0 cPs to about 100 cPs.

13. The method of claim 7, wherein after injection, the aqueous flooding fluid has a viscosity of about 1 cPs to about 5,000 cPs.

14. The method of claim 7, further comprising displacing the hydrocarbon fluid in the formation into one or more production vessels.

15. The method of claim 7 wherein the aqueous flooding fluid before injection has a viscosity of 0 cPs to about 100 cPs, and after introducing the aqueous flooding fluid into the formation, the viscosity of the aqueous flooding fluid increases to about 1 cPs to about 5,000 cPs.

16. The method of claim 15, wherein the aqueous flooding fluid further comprises a surfactant, a biocide, an antioxidant, or a combination thereof.

17. The method of claim 15, further comprising displacing the hydrocarbon fluid in the formation into one or more production vessels.

18. The method of claim 5, wherein after hydrolysis of cross-linked monomer units, the water-soluble polymer is a linear polymer.

* * * * *

UNITED STATES PATENT AND TRADEMARK OFFICE
CERTIFICATE OF CORRECTION

PATENT NO.         : 10,435,496 B2                                              Page 1 of 1
APPLICATION NO.    : 14/154701
DATED              : October 8, 2019
INVENTOR(S)        : Peter E. Reed et al.

It is certified that error appears in the above-identified patent and that said Letters Patent is hereby corrected as shown below:

In the Claims

On Column 36, Claim 3, Line 64:
"ofH," should read "of –H,"

On Column 36, Claim 3, Line 67:
"H," should read "–H,"

Signed and Sealed this
First Day of December, 2020

Andrei Iancu
*Director of the United States Patent and Trademark Office*